US006894606B2

(12) United States Patent
Forbes et al.
(10) Patent No.: US 6,894,606 B2
(45) Date of Patent: May 17, 2005

(54) VEHICULAR BLACK BOX MONITORING SYSTEM

(76) Inventors: Fred Forbes, 3263 E. Broadway Blvd., Tucson, AZ (US) 85716; Scott Forbes, 3254 W. Green Ridge Dr, Tucson, AZ (US) 85741; David Forbes, 2602 E. Helen, Tucson, AZ (US) 85716; James Forbes, 6999 Canada Dr, Sierra Vista, AZ (US) 85650

(*) Notice: Subject to any disclaimer, the term of this patent is extended or adjusted under 35 U.S.C. 154(b) by 411 days.

(21) Appl. No.: 09/991,509

(22) Filed: Nov. 21, 2001

(65) Prior Publication Data

US 2002/0105438 A1 Aug. 8, 2002

Related U.S. Application Data

(60) Provisional application No. 60/252,537, filed on Nov. 22, 2000.

(51) Int. Cl.$^7$ .................................................. B60Q 1/00

(52) U.S. Cl. ....................... 340/435; 340/903; 340/904; 340/436; 340/437; 340/439; 340/575; 340/576

(58) Field of Search ................................ 340/435, 436, 340/903, 904, 437, 439, 575, 576

(56) References Cited

U.S. PATENT DOCUMENTS

| | | | | |
|---|---|---|---|---|
| 4,716,458 A | | 12/1987 | Heitzman et al. | 358/103 |
| 4,931,937 A | | 6/1990 | Kakinami et al. | 364/424.01 |
| 4,970,653 A | | 11/1990 | Kenue | 364/461 |
| 5,351,044 A | | 9/1994 | Mathur et al. | 340/901 |
| 5,465,079 A | | 11/1995 | Bouchard et al. | 340/576 |
| 5,521,580 A | | 5/1996 | Kaneko et al. | 340/439 |
| 5,555,312 A | | 9/1996 | Shima et al. | 382/104 |
| 5,642,093 A | | 6/1997 | Kinoshita et al. | 340/439 |
| 5,684,697 A | | 11/1997 | Mullen | 364/426 |
| 5,689,249 A | | 11/1997 | Sakamoto et al. | 340/901 |
| 5,699,057 A | | 12/1997 | Ikeda et al. | 340/937 |
| 5,729,619 A | | 3/1998 | Puma | 382/115 |
| 5,745,031 A | | 4/1998 | Yamamoto | 340/439 |
| 5,765,116 A | | 6/1998 | Wilson-Jones et al. | 701/41 |
| 5,790,403 A | | 8/1998 | Nakayama | 365/424 |
| 5,815,093 A | | 9/1998 | Kikinis | 340/937 |
| 5,835,008 A | | 11/1998 | Colemere, Jr. | 340/439 |
| 5,844,505 A | | 12/1998 | Van Ryzin | 340/988 |
| 5,850,193 A | | 12/1998 | Shimoura et al. | 340/995 |
| 5,850,254 A | | 12/1998 | Takano et al. | 348/148 |
| 5,929,785 A | | 7/1999 | Satonaka | 340/903 |
| 6,580,986 B1 | * | 6/2003 | Uenuma et al. | 701/41 |

* cited by examiner

*Primary Examiner*—Daryl C. Pope
(74) *Attorney, Agent, or Firm*—Cislo & Thomas LLP

(57) ABSTRACT

A vehicular "black box" provides recording means by which driver action can be reviewed after an accident or collision, as well as indicating immediate vehicle disposition status to the driver. Using cameras (which may be very small), the disposition of the vehicle in its lane is determined by detecting the highway lines painted on the road.

The data is also recorded so that should an accident or collision occur, the events leading up to such an event are made available for later review and analysis.

44 Claims, 12 Drawing Sheets

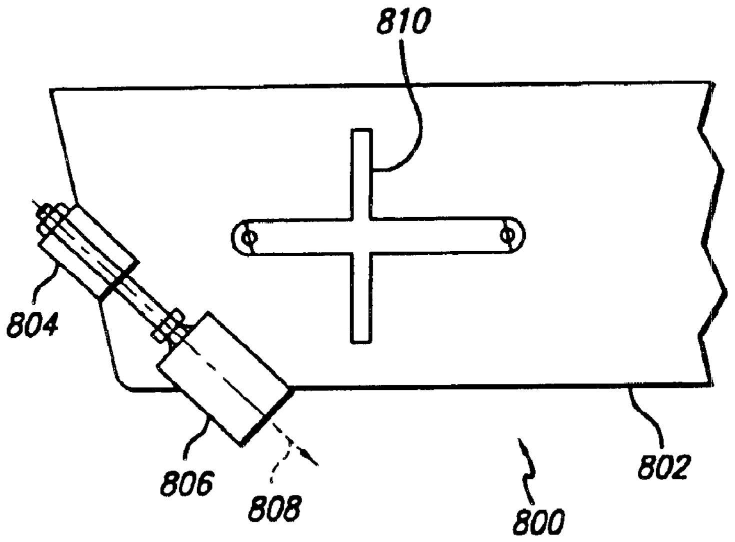
FIG. 8
FIG. 13
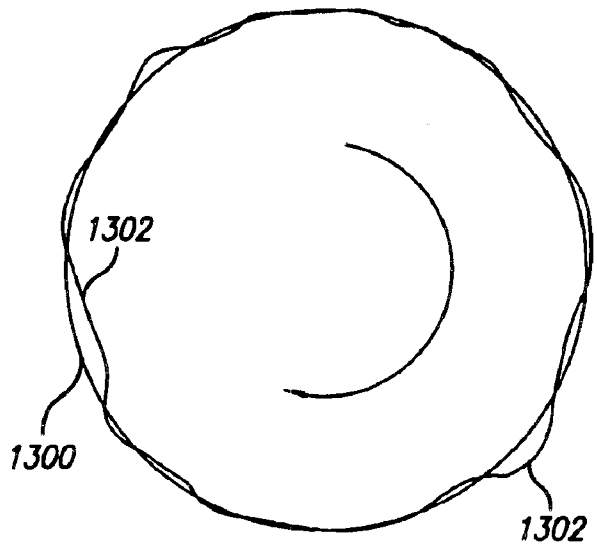
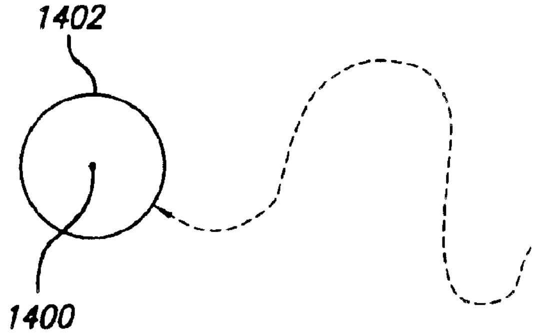
FIG. 14

VEHICULAR BLACK BOX MONITORING SYSTEM

CROSS-REFERENCES TO RELATED APPLICATIONS

This application claims priority from a provisional application filed on Nov. 22, 2000, having the application No. 60/252,537.

BACKGROUND OF THE INVENTION

1. Field of the Invention

This invention relates to monitoring and recording systems for transportation systems, and more particularly to a "black box" system for monitoring and recording the activity in a motor vehicle.

2. Description of the Related Art

In order to provide forensic evidence of catastrophic failure of aircraft and the like, recording devices denominated as "black boxes" have been installed in commercial airliners for the past several years. These black boxes are generally of two types: the cockpit voice recorder and a flight data recorder. The cockpit voice recorder records the voices of the pilots and crew in the cockpit area for approximately thirty (30) minutes prior to the catastrophic failure of the aircraft. The flight data recorder records instrument readings and the like. A shared clock or otherwise can allow the coordination of flight data with voice data, such that forensic analysts can re-constitute the events and actions leading up to a catastrophic failure of the aircraft that results from a crash or other failure.

Such black box devices could also advantageously be used in other vehicles or situations where a catastrophic event requires an analysis of events leading up to it. One such situation is present in long-haul truck driving where truck drivers transport cargo over long distances for long periods of time. One example might be a New York to Los Angeles run, where goods from New York City are acquired in Los Angeles and are transported most efficiently by truck. Due to the competitive nature of the business, drivers are asked or required to drive their rig for as long as possible, so that the shipment might be delivered as soon as possible. This often leads to driver fatigue and drowsiness, sometimes resulting in the failure of the driver to control the rig and, possibly, collisions, accidents, or crashes involving the rig.

As set forth in Appendix A, the National Highway Transportation Safety Administration (NHTSA) has addressed the issue of driver fatigue in a report regarding "Drowsy Driving and Automobile Crashes." The enclosed report is incorporated herein by this reference thereto. Not only do long-haul truck drivers experience fatigue and drowsiness, but also drivers of other vehicles as well, with there being certain groups or categories of individuals being more susceptible to such risks than others.

Because such sleepiness, drowsiness, and/or fatigue can lead to difficulties, and because technology may be available along the lines of those used in aircraft for recording events leading up to a vehicle failure or the like, it would be advantageous to provide a means by which both the driver can be alerted as to his/her drowsy condition in order to accommodate it, as well as a record of the events leading up to any crash or collision resulting from drowsiness. As set forth in more detail below, the present invention addresses these and other concerns.

SUMMARY OF THE INVENTION

The present invention provides a vehicular monitoring system in the form of a black box or the like that uses signals generated from video input in order to determine the disposition of the vehicle on the roadway. By determining such vehicle disposition, the activity of the driver can then be monitored. In the event of a collision, crash, or if the vehicle drives off the road, the recording made by the vehicular black box of the present invention can then be used to evaluate and analyze the course of events preceding the crash or the like.

Generally, two video cameras are used in order to determine the highway lane through which the vehicle is traveling (although it may be possible to use any number of cameras). For a solid line, a continuous signal is given. For a broken line, an intermittent signal is given. In conjunction with association with a turn signal, the present invention can evaluate the driver's performance in keeping the vehicle on the roadway and alert the driver when the vehicle is not properly disposed in its lane.

Additionally, accuracy tests that indicate the mental, visual, and manual acuity of a driver are also disclosed herein and serve to provide an indication of future driving performance as generally the same skills needed to properly drive an automobile, a bus, a large truck or rig, or other motor vehicle as are needed to perform well on such tests.

The system may be implemented for monitoring drivers associated with public safety concerns such as truck drivers and drivers with DUI records, sleep attack disorders and the like.

OBJECTS OF THE INVENTION

It is an object of the present invention to provide a warning system for driver drowsiness and the like.

It is yet another object of the present invention to provide a vehicular black box that allows reconstruction of an accident by providing a record of events prior to the occurrence of an accident.

It is yet another object of the present invention to provide a combination driver-drowsiness system as well as a vehicular black box in order to promote better driving and fewer accidents on the highways.

It is yet another object of the present invention to provide a system for rating a driver's performance based on a numeric scale characterizing a vehicle driver profile or signature based on his/her lane tracking ability.

These and other objects and advantages of the present invention will be apparent from a review of the following specification and accompanying drawings.

BRIEF DESCRIPTION OF THE DRAWINGS

FIG. 8 is a sectional view of a camera mounting within the housing of the side view mirror.

FIG. 9 is a chart showing the regular and intermittent detection of dashed lines on a roadway.

FIG. 10 is an enlargement of a portion of FIG. 9 showing contrast of reflected light.

FIG. 11 is an enlargement of a portion of FIG. 9.

FIG. 12 is an enlargement of a portion of FIG. 9.

FIG. 13 is a depiction of a test and results used in the present invention, where an individual attempts to trace out a circle using a mouse or other device driving a cursor on a computer screen.

FIG. 14 shows a depiction of a test to determine response time and accuracy, where the individual attempts to follow a spot on the screen with a mouse driving a cursor.

BRIEF DESCRIPTION OF THE APPENDICES

The following appendices are incorporated herein by this reference thereto.

Appendix A is a National Highway Transportation Safety Administration (NHTSA) Report.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
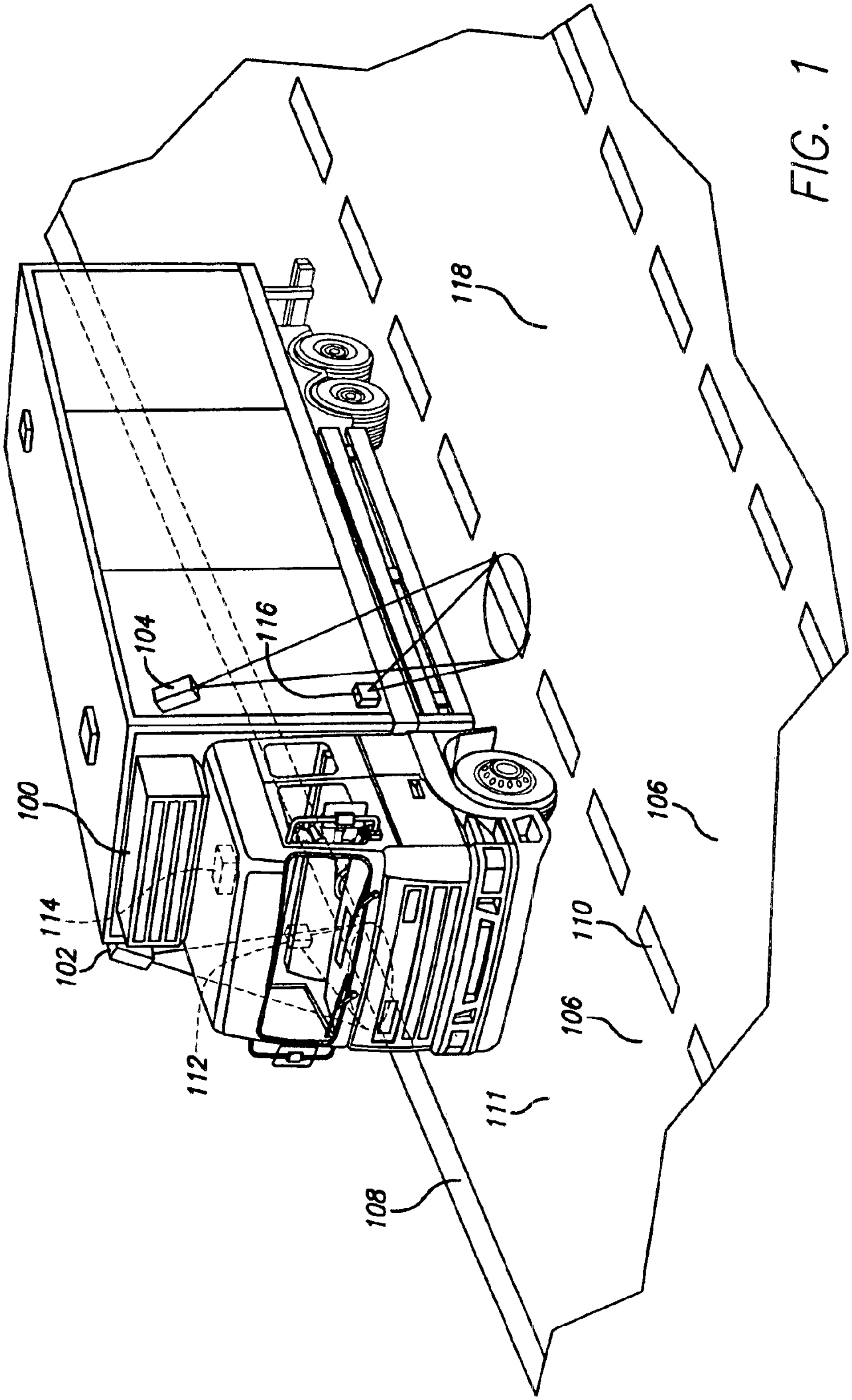
FIG. 1 is a general schematic depiction of the vehicular black box system of the present invention, showing a vehicle and driver travelling down a roadway towards the viewer.

FIG. 1 shows a front plan view and perspective of a truck, rig, bus, or other vehicle 100 incorporating the vehicular black box system of the present invention. As shown in FIG. 1, two cameras, 102, 104, are oppositely opposed on either side of the vehicle. Both cameras 102, 104 are preferably at equal distances away from the body of the vehicle. Typically, lanes are marked in America's interstate highway system by dashed or solid white or yellow lines. The cameras 102, 104 look down to the roadway 106 in order to detect the right shoulder white line 108 and the center dashed line 110.

The cameras may be mounted at any convenient location for looking down at the roadway, such as on the body of the vehicle or in the side view mirror attachments or housings, which are located on the doors or side of the vehicle. The cameras may be attached to the vehicle by any convenient means including bolting, welding, and adhesion.

FIG. 8 illustrates one example of a camera mounting 800 within the housing of the side view mirror 802. A mounting cylinder 804 is inserted through a hollowed out portion of the housing 802 as shown in the figure. The camera 806 is bolted to the mounting cylinder, and likewise is inserted through a hollowed out portion of the housing 802. The camera 806 is positioned to look downward at the road as indicated by the dashed arrow 808 preferably at an angle of approximately 45° with respect to the road. The vehicle itself, not shown in the figure, is located to the left of the housing. Additionally, the cross bar 810 shown in the figure is part of the mounting for the mirror.

Going back to FIG. 1, the camera, 102, on the right side of the vehicle seeks to detect the line 108 on the right shoulder. The camera 104 on the left side of the vehicle seeks to detect the center dashed line 110. For a vehicles such as a truck, each camera is preferably at a distance of approximately 11 feet from the highway surface.

As shown in FIG. 1, the vehicle travels in the right lane 111 of the four-lane highway divided in two lanes going in opposite directions. As set forth in more detail below, the black box of the present invention is not limited to use when the vehicle is travelling in the right highway lane.

Additionally, as shown in FIG. 1, the right shoulder white line 108 may be illuminated by a right shoulder light 112 so that the right camera 102 may better pick up the white line 108 of the right shoulder. In one embodiment, the light, 112, may be a regular light focused upon the white line of the right shoulder, illuminating a circle of approximately 2 feet in diameter centered at the camera field. Additionally, the light 112 may be tuned to a special frequency of light (e.g. infrared) that might be available through a light source such as a laser, light emitting diode, or the like. A condensing lens may be used to spread out the image. The right camera 102 may then pick up specifically reflected light by the right shoulder line 108 (of white or any other color) that is unique to the frequency of the laser light. In this way, other sources of illumination will be ignored, and the camera can focus specifically upon light reflected upon reflective or other material imbedded or incorporated into the paint of the right shoulder line 108.

The camera 102 may be a CCD (Charge Coupled Device) that is extremely sensitive while being very small, preferably in the order of an inch and a half square and requiring very little power. Consequently, it is generally easy to fit cameras onto the vehicle such as an 18-wheel, big rig, or the like. The camera 102 is connected to a central control or recording device 114 termed "black box."

The left-side camera 104, which is displaced horizontally on the other, or left side of the vehicle, functions similarly to the right side camera 102. A center dashed line light 116, may operate in a manner similar to that as the right side light 112 for the camera 102. The left light 116 operates for the left camera 104, while the right side light 112 operates for the right camera 102. The lights may be mounted at any convenient location for operating with the cameras.

Consequently, it can be seen that despite varying external conditions, cameras 102 and 104 are able to pick up the highway lines and use them as indicators of the vehicle's disposition between them.

Figure 2:
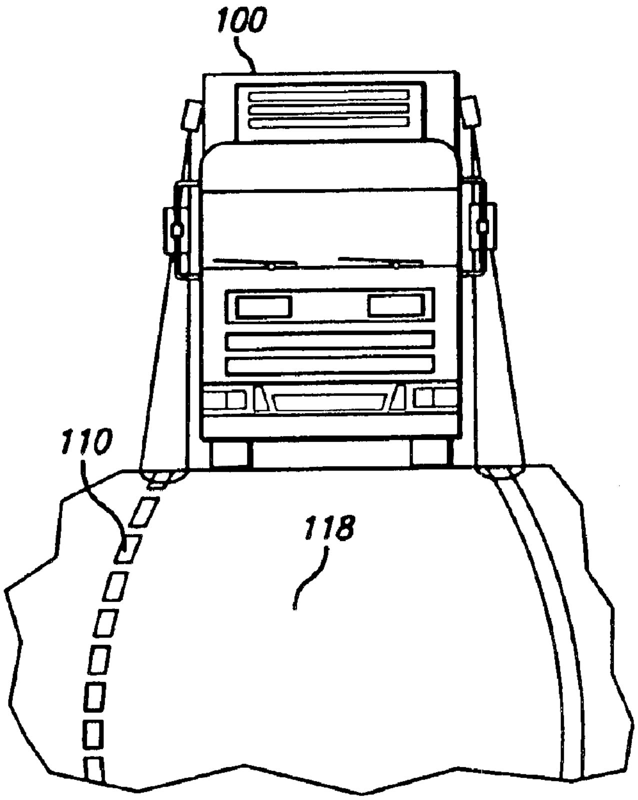
FIG. 2 is a front plan and schematic view of the vehicular black box system of the present invention showing the vehicle in the passing lane.

FIG. 2 shows a front schematic view of the vehicle 100 of FIG. 1 when it is in the passing lane 118. When in the passing lane, the vehicle has a dashed white center line 110 on its right and a generally solid yellow lane line on its left. The right camera 102 then picks up the dashed center line, while the left camera 104 picks up the solid left shoulder line.

For travel in either a traveling lane, a passing lane, or a lane between (where the lines on both sides of the vehicle are dashed), the right camera 102 and left camera 104 pick up the video signals from the lines (converting them to electrical signals) from which the travel of the vehicle in the lane can be determined. Any variance, drifting, swerving, or the like in the lane is detected by the cameras and recorded by the black box. By inspection of the signals from the cameras, the travel of the vehicle along the roadway can be determined.

Figure 3:
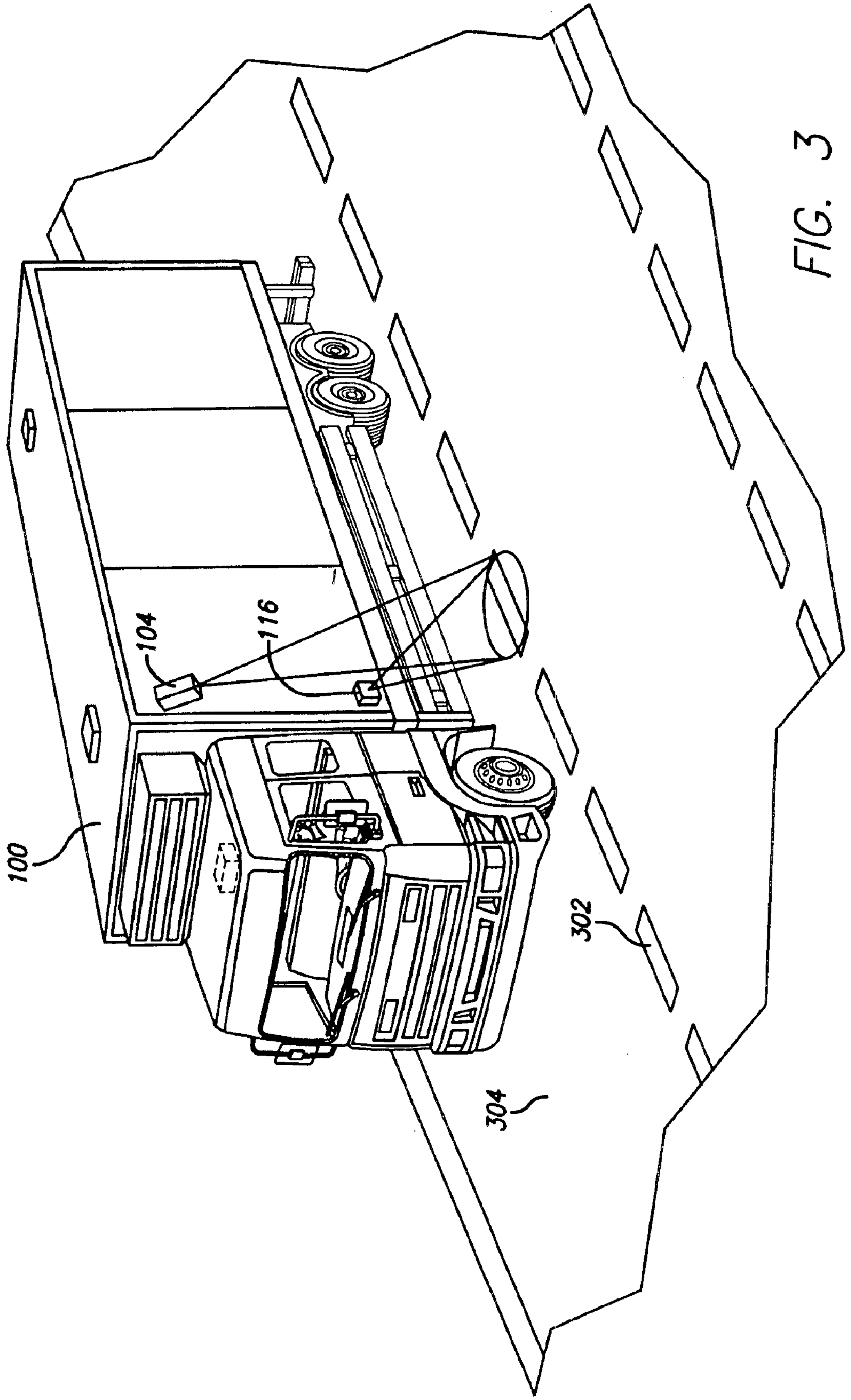
FIG. 3 is a front left perspective view of the vehicular black box system of the present invention as attached to a large vehicle.

FIG. 3 shows an alternative embodiment of the camera configuration of the present invention. The left camera 104 is mounted along the side of the vehicle 100 so as to pick up the travel of the line on the left-hand side of the vehicle. In the case of FIG. 3, the illuminated lines picked up by the camera are the dashed center lines 302 as the vehicle is travelling in the right-most lane 304 of the roadway.

By detecting the presence and location of the highway lines on either side of a lane, the system can determine the magnitude of deviation of the vehicle from the center of the lane. Determination of the centroids of the signals received from the camera serves as an indication of the presence and relative position of the line. The magnitude of deviation from the center can be based on the detection of how far the vehicle is from the highway lines on each side of the vehicle. For a vehicle traveling exactly in the center of the lane, the distance between the vehicle and the highway lines on either side of the vehicle should be equal. Additionally, a driver may determine his ideal position in the lane and set the system to zero at that position, thereafter, any detected deviation away from the set position will be indicated to the driver. Alternatively, the system may detect and indicate to the driver any change from a previous position relative to the lane, without having a point of reference indicating an ideal position. An indication that the driver is constantly or erratically changing positions relative to the lane (say approximately every 2 seconds) may serve to indicate that the driver is weaving.

Although two cameras have been illustrated in the above figures, any number of cameras may be used. For a system having one camera, the driver's position within a lane may be monitored by detecting the position of the highway line within the field of view of the camera by determining the centroids of the signals received. For a vehicle traveling in a straight path within a straight highway lane, the position of the highway line should be unchanging within the camera's field of view as described above. Any deviation from a given position indicates that the vehicle is swerving or otherwise not traveling in a straight line. Additionally, the driver may zero the system when he perceives his position in the lane to be the ideal position. Thereafter, the system would indicate any deviation from that position using one camera.

In order to enhance the video pick up of the dashed lines, especially at nighttime, a source of illumination or the like may be used to shine light upon the roadway, particularly the area through which the dashed lines travel as the truck or vehicle travels along the roadway. Per the above, the camera may be tuned to receive light particular to the source of illumination so as to ensure the appropriate detection of the dashed lines as they travel past the vehicle. When the vehicle is in the left-most lane, the yellow continuous highway line may be picked up and detected by the camera.

Figure 4:
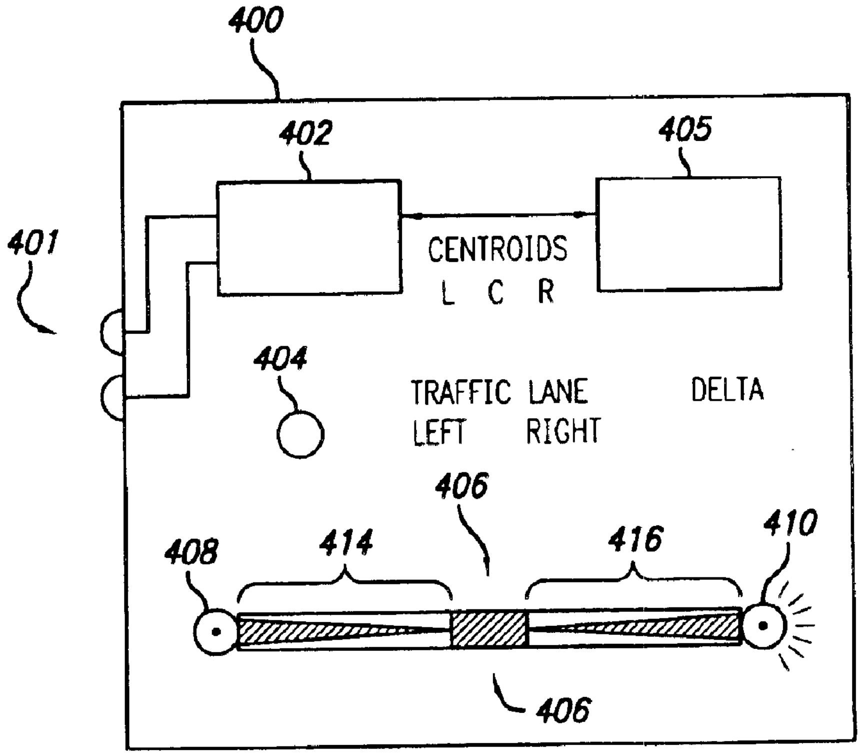
FIG. 4 is a schematic representation of elements composing or comprising the vehicular black box of the present invention.

FIG. 4 shows one embodiment of the present invention, where camera signal inputs are fit into a self contained black box 400, indicated by the arrow 401. The black box 400 includes a CK CPU 402 having a reset button 404. The CK CPU 402 is associated with a memory element 405, particularly the RAM memory, which may be remotely interrogated, and executes program steps upon the data in order to derive centroids. The centroids may indicate that the vehicle is left in a position where it should be, appropriately centered, or right at the position where it should be in the lane (L C R in FIG. 4). The computer may be a commercial computer equipped with a fast (e.g. 30 HZ) frame grabber having software to compute road line profile centroid strings which are processed and analyzed to determine vehicle lane observance and to alert the driver if the vehicle is in danger of unintentionally departing the lane.

A traffic lane indicator (left, right) is shown in FIG. 4 and may be used in conjunction with the turn signal or the like to indicate the lane in which the black box currently "sees" the vehicle. Additionally, a delta or adjustment function may be provided so as to allow for adjustment of the black box, where for any reason, an adjustment needs to be made for indicating the center position in a lane. A reset button allows the system to reset to a default configuration.

A display panel associated with the black box 400 has a lane position status indicator, 406, shown towards the bottom of FIG. 4 as generally an analog indicator, allowing the driver to monitor the position of the vehicle as perceived by the black box. At the extreme left, an alert 408 is given to the driver to indicate that he is drifting too far left. The same is true at the opposite end of the status indicator, where an alert 410 is given when a driver drifts too far right. A center lane 412 or proper disposition indicator is shown in the center of the status indicator. Between the center lane indicator and the far left alert, a "drifting left" 414 indication is given. Similarly, a "drifting right" 416 alert is given when the vehicle is departing from the center and going towards the right. The drifting left and drifting right indications provide means by which the driver can be alerted to the status before an alert is given. The center lane, drifting left or drifting right indications may be displayed by lights which illuminate a portion of the display corresponding to the position of the vehicle within the lane.

Figure 5:
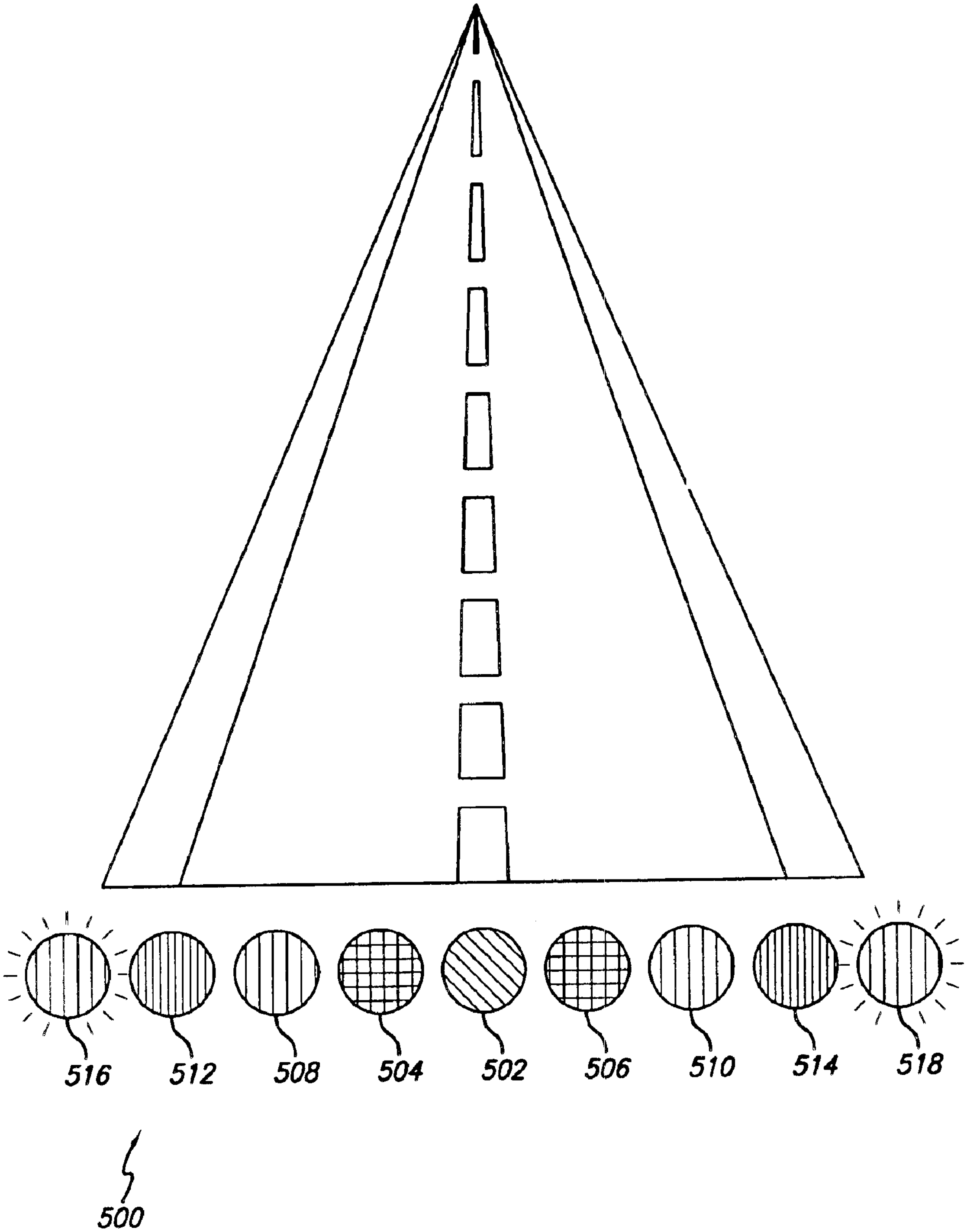
FIG. 5 shows a schematic representation of a roadway accompanied with indicator signals that may be associated with the vehicular black box of the present invention.

FIG. 5 shows an alternative embodiment of a lane position status indicator 500, showing a schematic view that disappears into the vanishing point of approximately 310 feet delivering approximately a seven degree (7°) angle for two lanes of a four-lane highway.

Figure 15:
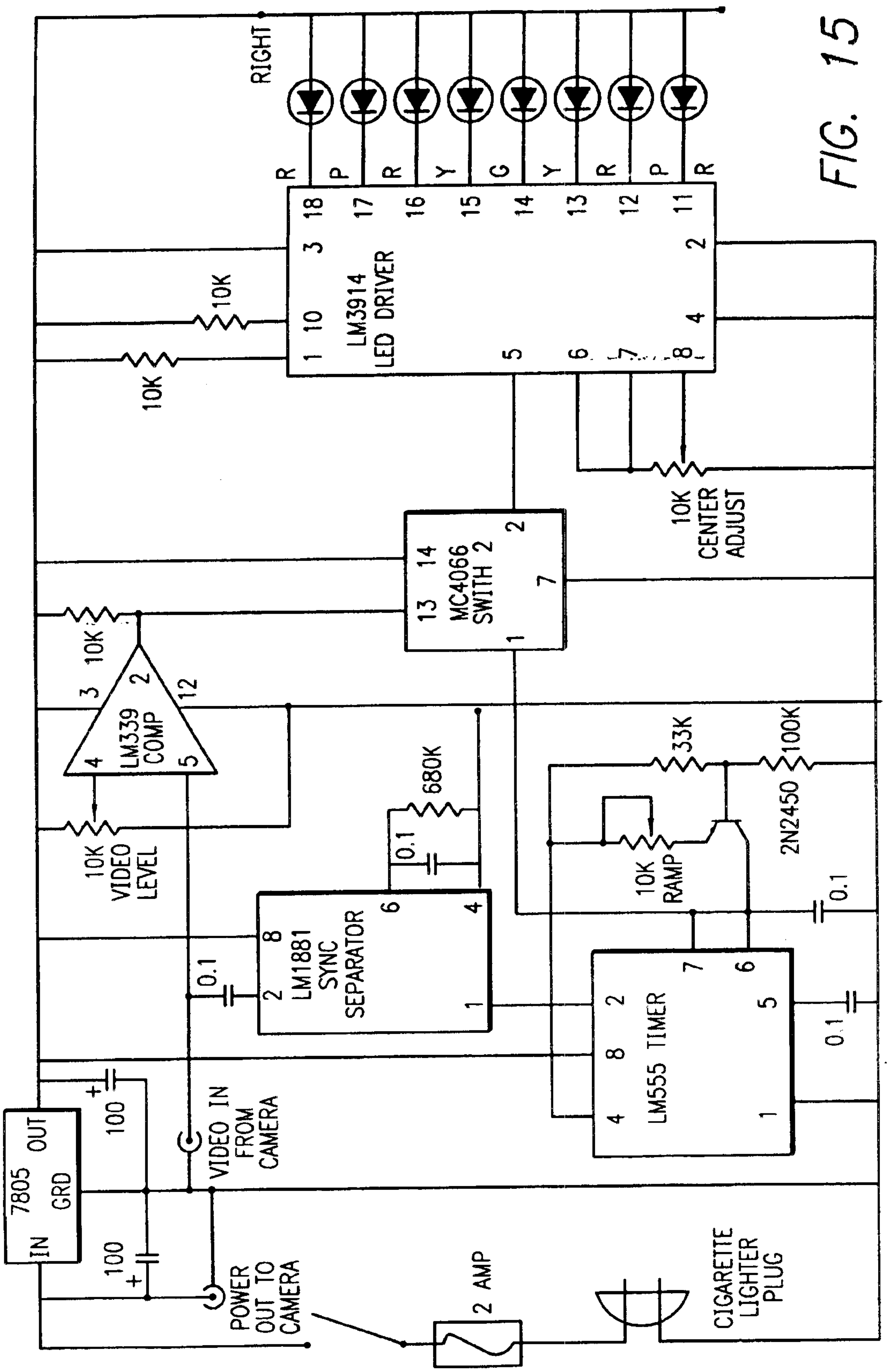
FIG. 15 is a schematic diagram for an electronic circuit for the lane position status indicator of FIG. 5.

When the vehicle is centered in the lane, a green light 502 goes on. Should it depart left or right (the area for which the green light shines, initially), a yellow light (504 or 506) comes on to alert the driver of his or her departure from the appropriate center line. After the yellow lights activate, a red light (508 or 510) come on, then pink (512 or 514), and then flashing red (516 or 518). All of these are shown in FIG. 5 and enable the black box of the present invention to provide not only a record of such departure from the center of the lane, but also an indication to the driver that such a departure is occurring. FIG. 15 is a schematic diagram for an electronic circuit for the lane position status indicator 500. The elements of the circuit are labeled in the figure.

A sound alarm may accompany the flashing red light in order to alert the driver of his/her potentially hazardous driving. This will serve to awaken a driver who has fallen asleep at the wheel. Such alarm may be turned off by the push of a button or may automatically taper off as the vehicle position is corrected to the lane center. The alarm may further be activated by the push of a button to test if it is properly operating. Features which allow the driver to set the alarm volume and select a certain type of alarm sound may also be provided. An adjustable threshold may also be set by the driver to establish the level of centroid error to activate the audible alarm system.

Before the alarm goes off, other milder warning signals, besides the light signals may be sounded such as a recorded voice warning when a driver is close to the flashing red zone. Various types of alarms and warning signals may be used, such as for example, the vibration of the wheel or seat, the activation of the vehicle air condition, heater, or fan, the automatic opening of the window, automatic activation of the radio, the release of a mist spray or perfume scent, or the sounding of a buzzer or car horn. Such alarm or warning signals may be scrambled so as to randomize agitation.

Additionally, the alarm may be programmed to go off after a predetermined time period, say 20 seconds, in which the vehicle is detected as deviating from the lane center at a specified threshold value. Other possible indications for activating the alarm may be the absence of movement of the steering wheel for a specified time period (e.g. 20 seconds), erratic steering, detection that the car is on the rumble bars or road grooves on the left or right shoulders, or long term pattern of steering errors which may indicate that the driver is drowsy. Detection of the rumble bars on the road may also provide a back up warning system should the lane status indication system fail. The warning alarm system may also have a multiplicative feature such that multiple errors are weighted exponentially, rather then on an additive basis.

The cameras and black box system may be on standby mode, and ready to operate once the vehicle is in forward gear. Furthermore, the black box may go into a high speed data logging mode when a dangerous situation is detected, to create a more accurate record of the driving in case an accident were to occur.

The system may include other features such as a status button which allows the driver to bring up his record for review, or to display notes and messages sent from the company headquarters.

Figure 6:
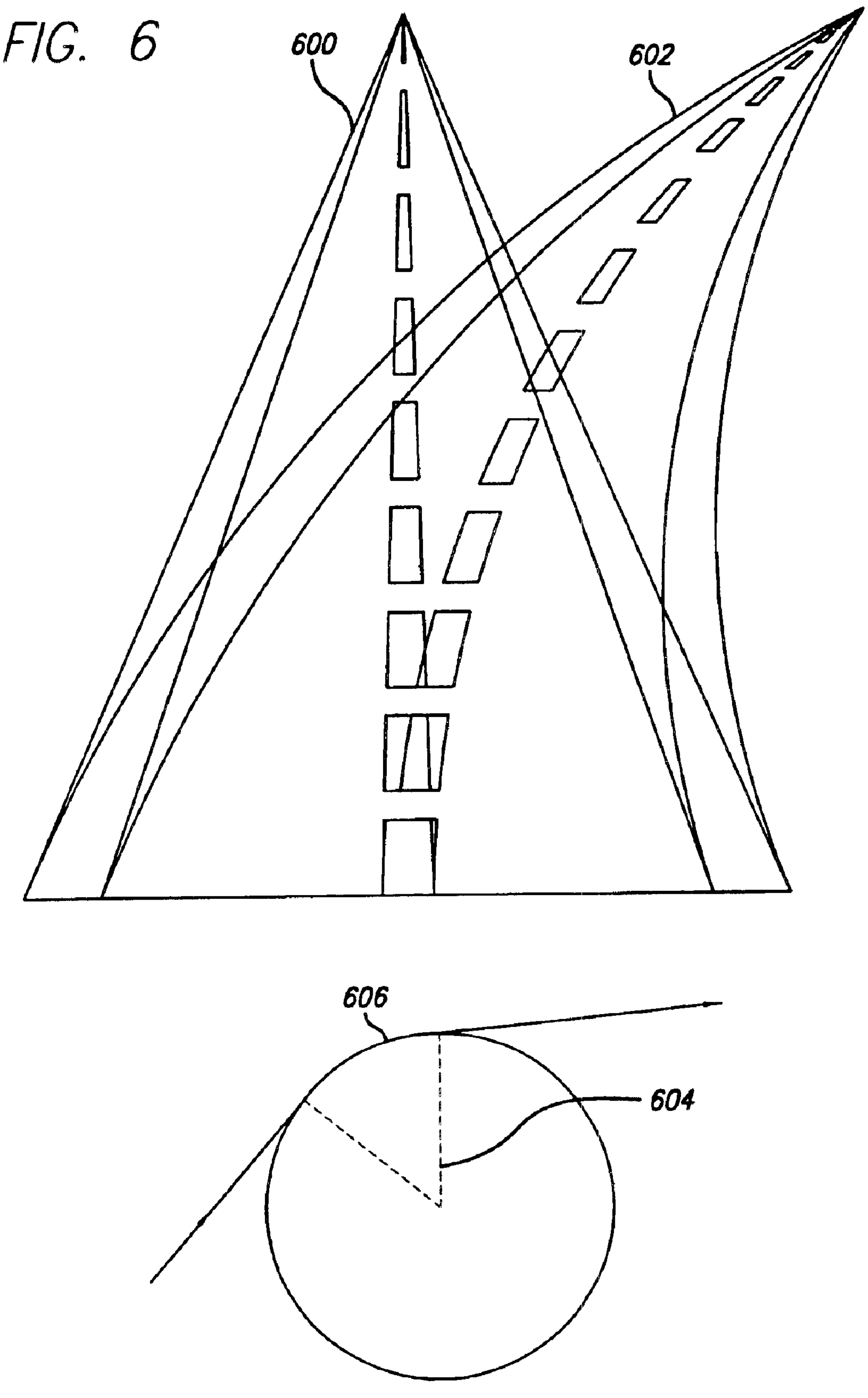
FIG. 6 shows a comparative depiction of curved and straight roadways for engagement by the vehicular black box of the present invention.

FIG. 6 shows a vanishing point diagram for both straight roads 600 and curved roads 602. For curved roads, the radius of the curvature 604 for a segment 606 of the road is determined by forming a circle having a curvature according to the portion of the segment as shown in the bottom of FIG. 6. The black box of the present invention helps to determine the centeredness of the vehicle, whether or not the vehicle is travelling on a straight road or a curved road by picking up centroids derived from the painted lines alongside the vehicle.

According to the present invention, a driver's overall performance based on the driver's lane tracking ability may be rated by monitoring and logging into the black box a driver's deviations from the center of a lane. The system may be set to record the instantaneous deviations from the center, and assign a numeric value to the deviation, which most conveniently is the distance away from the center. The average or RMS (root mean square) value of the deviations from the lane center monitored periodically (e.g. 30 times a second) on an ongoing basis, or over the course of a given trip could be used to assign a numeric value based on a scale for characterizing driver performance. Various methods for characterizing driver performance based on the driver's deviations from the center lane, recorded periodically for a given period of time, or based on other driving errors made, will be apparent to one skilled in the art.

A black box according to the present invention, is preferably designed to be tamper proof, concealed, weatherproof, and to survive an accident. Additionally, stations for calibrating and interrogating the driver's back box may be provided, and frequent stops at such stations may be made mandatory for certain drivers, for example truck drivers and bus drivers. Such calibration stations may have a simulated road lane with the lines of the road laid down perfectly for allowing the driver to check the system as well as his own driving abilities to calibrate the system.

Figure 7:
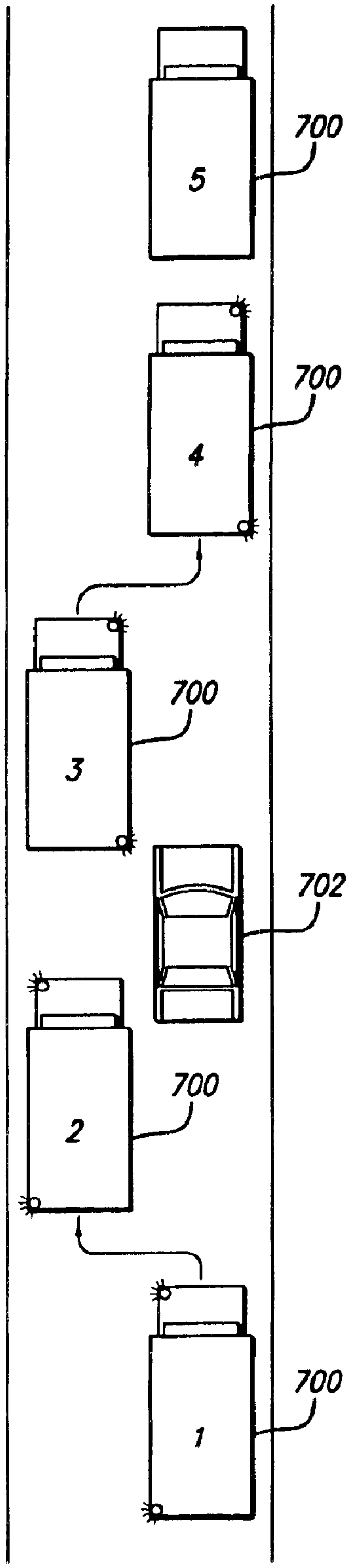
FIG. 7 shows a schematic representation (scenario) of one vehicle passing another, implementing the present invention.

FIG. 7 shows a diagram of a passing scenarios where a first vehicle 700 passes a second slower vehicle 702 on the left of that second slower vehicle. The positions of the passing vehicle 700 are indicated by the positions 1–5 in the figure, wherein the vehicle 700 starts from position 1 and finishes passing at position 5. The left turn signal is turned on at position 1 and 2 as the vehicle enters the passing lane, and the right turn signal is turned on at position 3, 4, and 5 as the vehicle returns to its lane. The black box of the present invention may be coupled to the turn signals of the vehicle, allowing for appropriate compensation of the activities occurring with respect to the detected highway lines as the vehicle passes the second, slower vehicle. As such, deviations from the center of a lane due to the driver making a lane change will not be registered by the system for factoring into the driver performance rating, and the position status indicator will not indicate that the driver is drifting off the center of a lane. Additionally, the system could record data while the driver is passing another vehicle to determine how safely the driver is able to pass, taking into account factors such as the drivers speed and time it takes the driver to return to the traffic lane.

In one embodiment, the turn signals may indicate to the black box that a lane change is occurring, particularly when the speed of the vehicle stays the same or increases. Generally, vehicle speed is maintained or increased when passing a vehicle. However, very often the vehicle is slowed to a complete stop, or very nearly a complete stop, before engaging the turn signal for a left- or right-hand turn.

FIGS. 9–12 show graphical output derived from data arising from the detection of the highway lines using a single camera.

Figure 9:
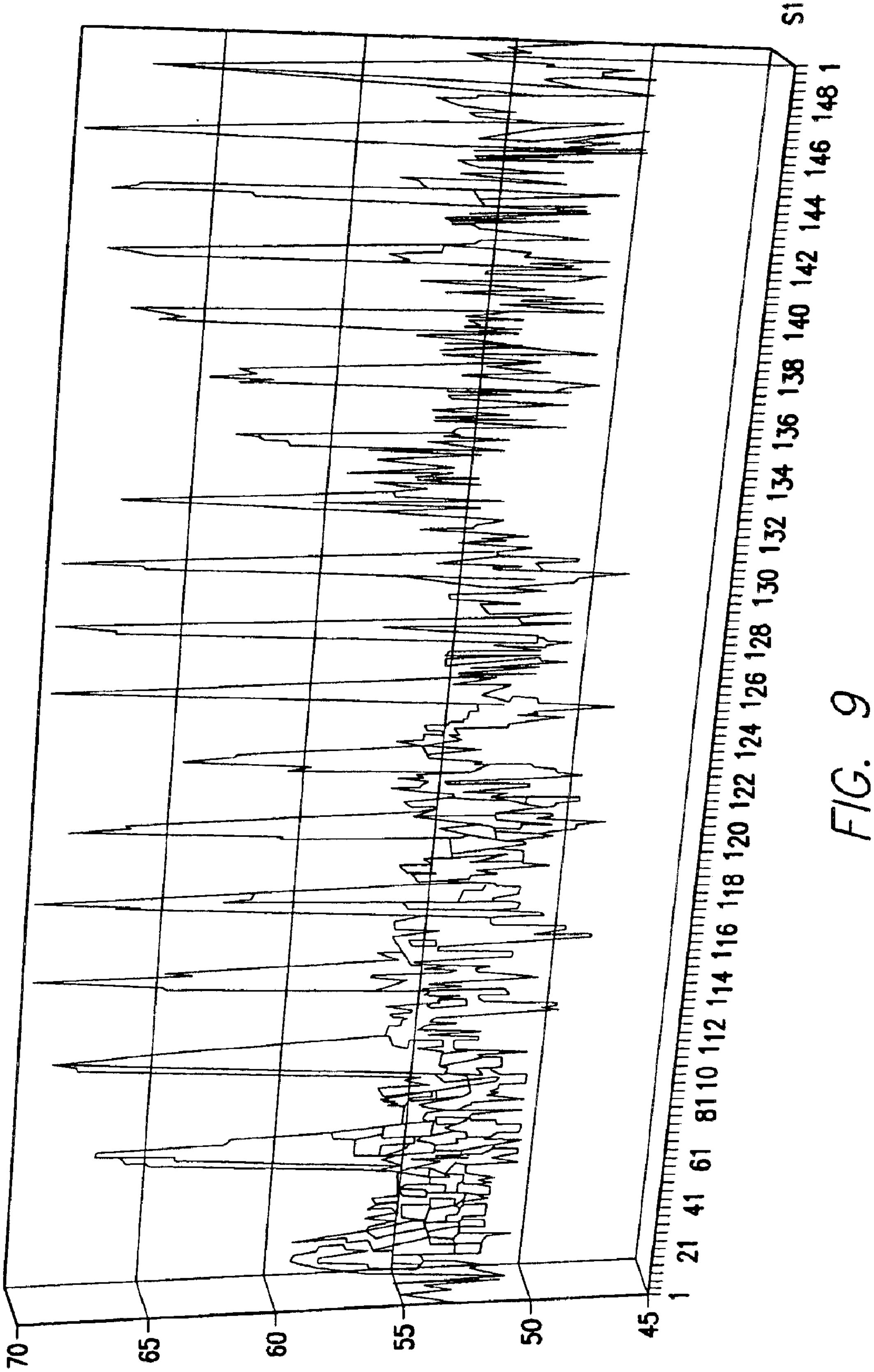
FIGS. 9–12 are charts depicting signals arising from the detection of roadway markers, such as stripes or painted lines.

FIG. 9 is a plot of intensity versus time showing the intermittent, but regular, detection of the dashed lines present on the left-hand side of the travelling lane on a highway. The peaks indicate the amount of the line detected by the camera. The plot shows both the basic noise level as well as the market peaks indicating the detection of lines. Change of intensity in the peaks indicates that the driver has deviated from a straight path which is exactly parallel to the highway lines.

Figure 10:
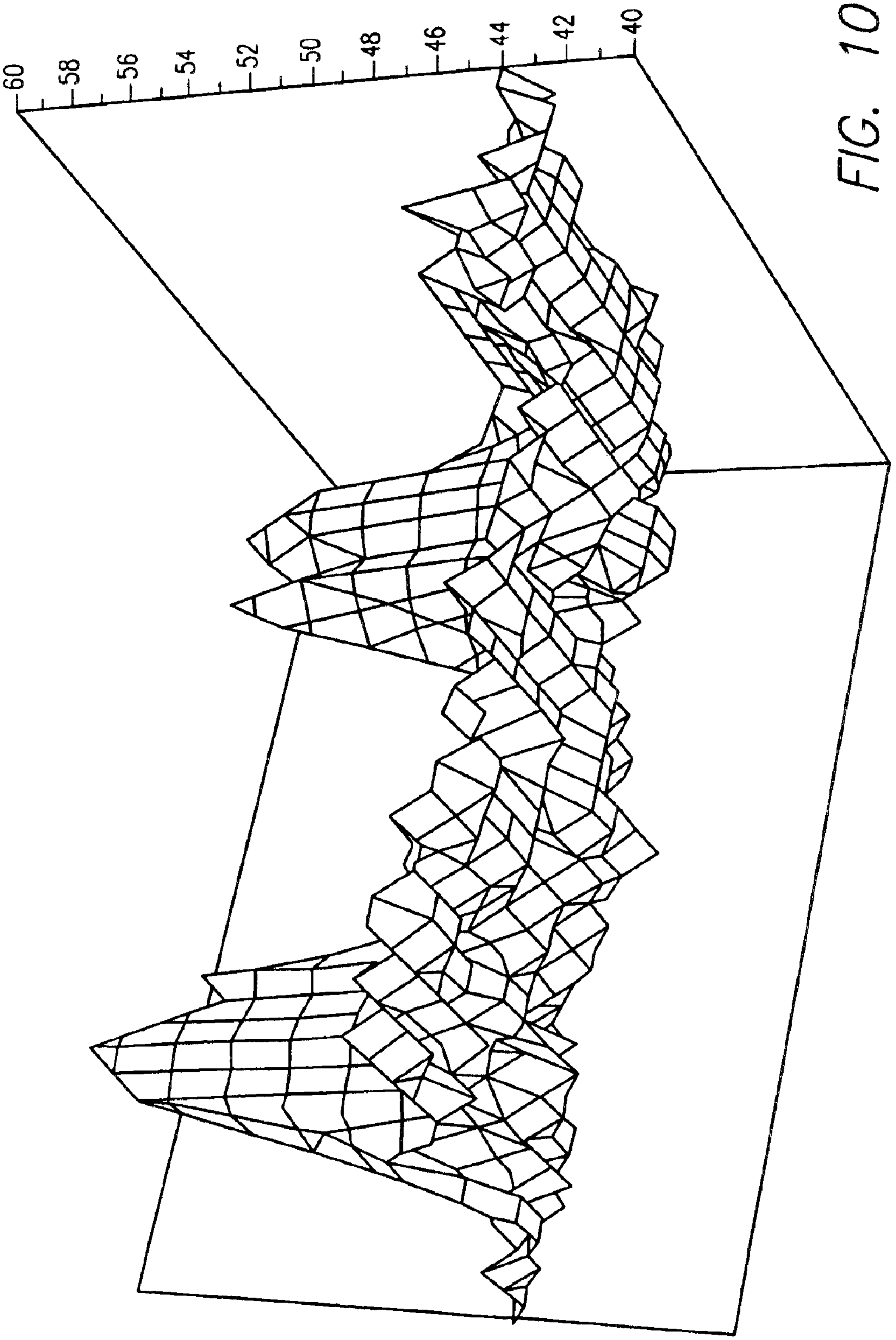
Figure 11:
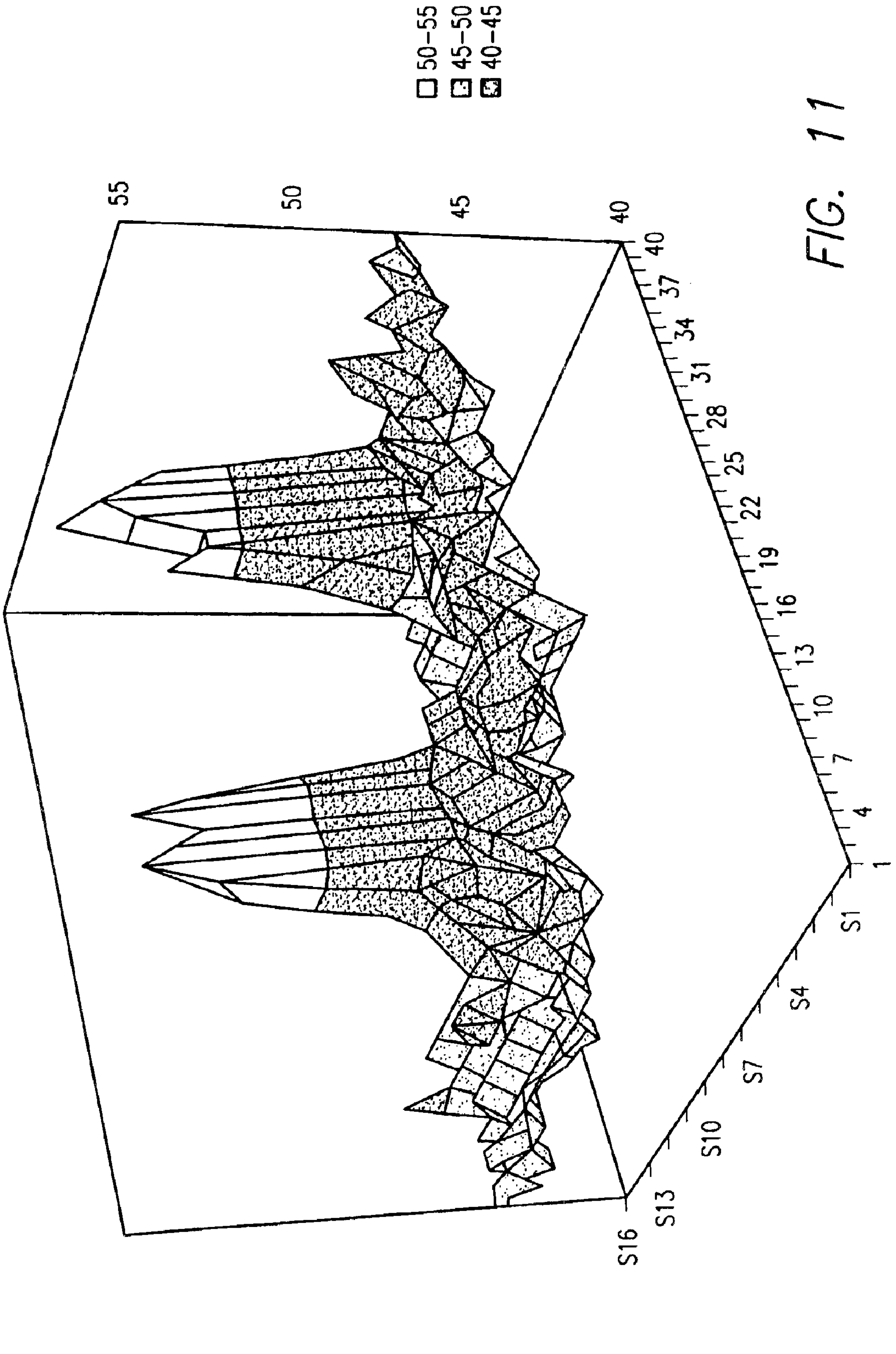
Figure 12:
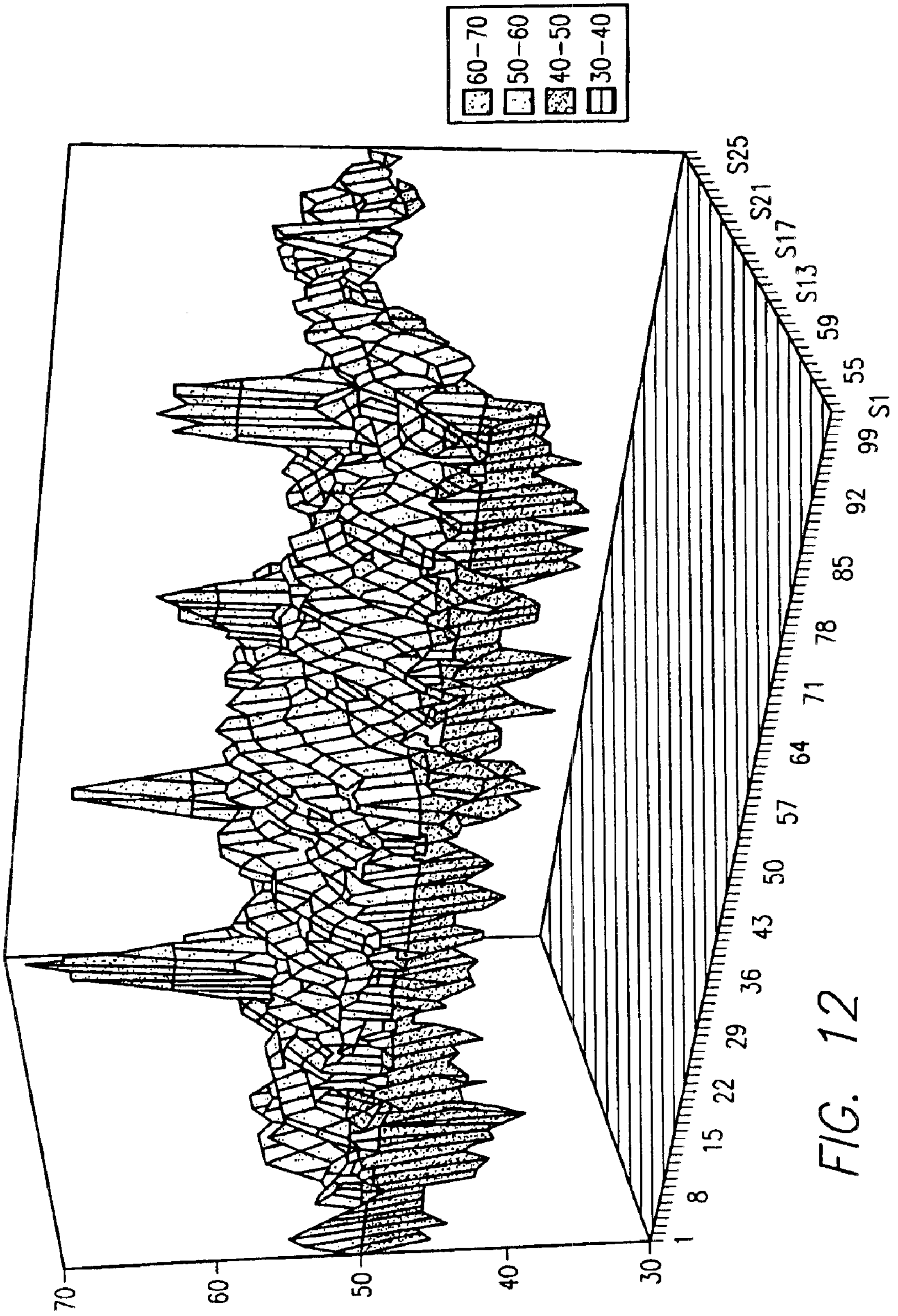

FIGS. 10–12 show the intensity profiles of FIG. 9 in typical 3-D plots for fewer spots.

Additionally, various test may be designed to characterize the driving profile of a driver, which include determining the driver's response time. Such tests may be given to drivers at interrogation stations or whenever else necessary to determine how well a driver can perform.

A circle tracker test, shown in FIG. 13, is one example of an accuracy test that may be used to help determine the driver's activity behind the wheel. The circle tracker is a device that displays a circle 1300 on the monitor. The user taking the test is then required to trace the circle using the mouse. Typical tracing lines 1302 are indicated in the figure. RMS error is recorded when the cursor departs from the circle on the screen. A log is kept with a running average of each error and can be used to show the manual coordination of an individual and his/her ability to accurately trace a circle on a computer screen.

Another test for characterizing a driver's response time and accuracy is a spot clicking test, shown in FIG. 14. A spot 1400 moves about the screen through a random path, for example, as indicated by the dashed line in the figure, and the individual must place a circle 1402 over the spot using the cursor to navigate the circle. RMS error may be recorded as a function of the speed that the spot moves, and a running average may be kept of the error. Additionally, there are varying speeds which may be set for the moving spot, so that the ability of the driver to track the spot is well tested.

Alertness tests may also be administered while driving. Such tests might involve responding to a sound command or image projected on the windshield. For example, a screen windshield projection or virtual image may be activated in the driver's field of view on which a number, letter, word, symbol, or symbols are presented momentarily to the driver for identification; or a voice command might request the driver to recite a string of numbers. The driver may then be required to reply verbally to a voice deciphering device, squeeze a switch, interrupt a light beam or otherwise respond indicating his response time by so doing. His input may be logged and he could be informed of the ranking of his response. The screen information may be varied in size, color, orientation, length of projection time, etc., and will be programmed to appear when least expected.

The above tests, including characterizing the driver's lane tracking abilities according to the present invention provide a way of projecting how likely a driver is to make a driving mistake which can lead to a fatal accident. Additionally, these tests can be used for field sobriety testing, as they are simple to administer.

The monitoring of drivers can also be used for providing a safe system for drivers with sleep disorders characterized by the rapid onset of sleep called sleep attacks. Such drivers can be observed in a laboratory environment for determining and recording the driver's characteristic brain wave patterns during the transition from wakefulness to sleep. The driver's characteristic brain wave patterns can be stored into a device that monitors the driver's brain waves on the road and sounds an alarm when such pattern that can lead to a sleep attack is detected. A device for monitoring the driver's brain waves can be a band which may be a part of a variety of hats (i.e. cowboy, baseball, visor hats) containing conductive electrodes so placed as to sample the driver's EEG brain wave activity or change thereof. A suitable warning device, calibration system, recording element, and/or a tiny transmitter may be incorporated into the band.

A number of alternative embodiments of the present invention may be achieved, aiding in the tracking, detection, auditing and/or monitoring of the vehicle's travel, particularly across the United States or otherwise.

In one embodiment, a radar-like detection system may be used in order to maintain the distance between the vehicle in front of the driver's truck or other vehicle. This would allow the driver to maintain a safe distance between his vehicle and the one in front of him. In another embodiment, a light source of a specific frequency might be used to reflect off the vehicle in front, the time being gauged very accurately so as to determine the distance between the two vehicles. Other means may also be used. Generally, one second of time should exist between the vehicles for each ten (10) miles-per-hour of speed.

With the development of wireless applications, information regarding the vehicle may be transmitted to a satellite uplink and then distributed to a central or Internet-based information distribution system. Devices such as those known as the Palm Pilot (marketed by 3Com) may be used to access the data and monitor the travel of the vehicle across the U.S. or otherwise. A panic button or the like may also be included in such wireless applications, immediately notifying authorities in case an event of highway piracy or vehicle breakdown should occur.

GPS applications may also be used, such that the satellite uplink information includes information derived from the Global Positioning System (GPS). Geographical information in the form of longitude and latitude are then delivered with the satellite uplink information. Additionally, information regarding the status of the vehicle according to its disposition and its lane of travel can also be uploaded, as well as a history of any alerts that may have occurred. With respect to the latter, the association of the turn signal with the black box becomes a significant feature as such alerts would be generated without the coupling of the turn signal to the black box.

Additionally, automatic log book applications could be coordinated with the black box of the present invention in order to provide automatic logging of the travel, expenses, and other relevant data with respect to the operation, maintenance, and mileage of the vehicle.

As forecasted by some, JavaScript applications or the like can be used with respect to all mechanical items on the vehicle. For example, when the oil reaches the end of its useful life, a signal can be given that the oil should be changed. Additionally, headlights that are about to go out or that have been used passed 90% of their useful life can also give signals that they are ready to be replaced, and the same can then be transmitted automatically for the next scheduled maintenance stop for the vehicle.

By providing a travel-detection and maintenance system along the lines described above, greater safety is provided for both the driver and those travelling along the same roads as the vehicle. This may allow for greater cargo capacities to be allowed on the highways, as wireless and other monitoring of the vehicle provide a greater margin of safety, possibly far exceeding that necessary for safe operation.

While the present invention has been described with regards to particular embodiments, it is recognized that additional variations of the present invention may be devised without departing from the inventive concept.

Appendix A

National Highway Transportation Safety Administration (NHTSA) Report:

"Drowsy Driving and Automobile Crashes"

NHTSA
People Saving People
http://www.nhtsa.dot.gov

DROWSY DRIVING AND AUTOMOBILE CRASHES

NCSDR/NHTSA EXPERT PANEL ON DRIVER FATIGUE AND SLEEPINESS

CONTENTS

NCSDR/NHTSA Expert Panel on Driver Fatigue and Sleepiness

Acknowledgments

Executive Summary

I. Introduction

- Methods and Knowledge Base of This Report
- Research Needs

II. Biology of Human Sleep and Sleepiness

- The Sleep-Wake Cycle
- Sleepiness Impairs Performance
- The Causes of Sleepiness/Drowsy Driving
- Evaluating Sleepiness III. Charncteristics of Drowsy-Driving Crashes 000002 40

IV. Risks for Drowsy-Driving Crashes

- Sleep Loss
- Driving Patterns
- The Use of Sedating Medications
- Untreated Sleep Disorders: Sleep Apnea Syndrome and Narcolepsy
- Consumption of Alcohol Interacts With Sleepiness To Increase Drowsiness and Impairment
- Interactions Among Factors Increase Overall Risk

V. Population Groups at Highest Risk

- Young People, Especially Young Men
- Shift Workers
- People With Untreated Sleep Apnea Syndrome and Narcolepsy

VI. Countermeasures

- Behavioral Interventions
- Medical Interventions To Treat Narcolepsy and Sleep Apnea Syndrome
- Alerting Devices
- Shift Work Measures
- Employer Management of Work Schedules
- Employee Behavioral Steps
- Using Bright Light Treatments

VII. Focusing an Educational Campaign: Panel Recommendations

- Educate Young Males About Drowsy Driving and How To Reduce Lifestyle-Related Risks
- Promote Shoulder Rumble Strips as an Effective Countermeasure for Drowsy Driving; in This Context, Raise Public Awareness About Drowsy-Driving Risks and How To Reduce Them
- Educate Shift Workers About the Risks of Drowsy Driving and How To Reduce Them
- Other Organizations Can Provide Drowsy Driving Education

References

Figures

Figure 1. Latency To Sleep at 2-Hour Intervals Across the 24-Hour Day

Figure 2. Performance Slows With Sleep Deprivation 000003
41

Figure 3. Time of Occurrence of Crashes

Figure 4. Interaction Between Alcohol and Sleepiness

---

NCSDR/NHTSA EXPERT PANEL ON DRIVER FATIGUE AND SLEEPINESS

SLEEP DISORDERS 216 844 8500

Kingman P. Strohl, M.D.
Panel Chairman Director, Center for Sleep Disorders Research
Division of Pulmonary and Critical Care Medicine
Cleveland Veterans Administration Hospital

Jesse Blatt, Ph.D.
Senior Research Psychologist
Office of Research and Traffic Records
National Highway Traffic Safety Administration

Forrest Council, Ph.D
Director
University of North Carolina Highway Safety Research Center

Kate Georges
Special Assistant to Executive Deputy Commissioner
Department of Motor Vehicles State of New York

James Kiley, Ph.D.
Director National Center on Sleep Disorders Research
National Heart, Lung, and Blood Institute
National Institutes of Health

Roger Kurrus
Division Chief,
Consumer Automotive Safety Information Division
National Highway Traffic Safety Administration

Anne T. McCartt, Ph.D.
Deputy Director
Institute for Traffic Safety Management and Research
State of New York

Sharon L. Merritt, Ed.D., R.N.
Director
Department of Medical-Surgical Nursing Center for Narcolepsy Research
University of Illinois

Allan I. Pack, Ph.D., M.D.
Director
Center for Sleep and Respiratory Neurobiology
University of Pennsylvania Medical Center

Susan Rogus, R.N., M.S.
Coordinator, Sleep Education Activities
Office of Prevention, Education, and Control National Heart, Lung, and Blood Institute

Thomas Roth, Ph.D.
Division Head
Sleep Disorders and Research Center
Henry Ford Hospital

HENRY FORD HOSP, SUITE 1D 1 FORD PLACE DETROIT MI 48202

Jane Stutts, Ph.D.
Manager, Epidemiological Studies
University of North Carolina
Highway Safety Research Center

Pat Waller, Ph.D.
Director
University of Michigan
Transportation Research Institute

David Willis
President
AAA Foundation for Traffic Safety

000004

42

ACKNOWLEDGMENTS

The Expert Panel on Driver Fatigue and Sleepiness especially acknowledges Joy Mara of Joy R. Mara Communications for her assistance in the writing of this report. The panel would like to thank the following people for their assistance in reviewing and commenting on the report: Mary Carskadon, David Dinges, Lynn Butler, Nick Teare, Toben Nelson, Nancy Isaac, Kathy Rechen, and, at Prospect Associates, Donald Cunningham and Wendel Schneider. It also thanks Cathy Lonergan for logistical support.

EXECUTIVE SUMMARY

Drowsy driving is a serious problem that leads to thousands of automobile crashes each year. This report, sponsored by the National Center on Sleep Disorders Research (NCSDR) of the Na-tional Heart, Lung, and Blood Institute of the National Institutes of Health, and the National Highway Traffic Safety Administration (NHTSA), is designed to provide direction to an NCSDR/NHTSA educational campaign to combat drowsy driving. The report presents the results of a literature review and opinions of the Expert Panel on Driver Fatigue and Sleepiness regarding key issues involved in the problem.

BIOLOGY OF HUMAN SLEEP AND SLEEPINESS

Sleep is a neurobiologic need with predictable patterns of sleepiness and wakefulness. Sleepiness results from the sleep component of the circadian cycle of sleep and wakefulness, restriction of sleep, and/or interruption or fragmentation of sleep. The loss of one night's sleep can lead to extreme short-term sleepiness, while habitually restricting sleep by 1 or 2 hours a night can lead to chronic sleepiness. Sleeping is the most effective way to reduce sleepiness.

Sleepiness causes auto crashes because it impairs performance and can ultimately lead to the inability to resist falling asleep at the wheel. Critical aspects of driving impairment associated with sleepiness are reaction time, vigilance, attention, and information processing.

CRASH CHARACTERISTICS

Subjective and objective tools are available to approximate or detect sleepiness. However, unlike the situation with alcohol-related crashes, no blood, breath, or other measurable test is currently available to quantify levels of sleepiness at the crash site. Although current understanding largely comes from inferential evidence, a typical crash related to sleepiness has the following characteristics:

- The problem occurs during late night/ early morning or midafternoon.
- The crash is likely to be serious.
- A single vehicle leaves the roadway.
- The crash occurs on a high-speed road.

- The driver does not attempt to avoid a crash.
- The driver is alone in the vehicle.

RISKS FOR DROWSY-DRIVING CRASHES

Although evidence is limited or inferential, chronic predisposing factors and acute situational factors recognized as increasing the risk of drowsy driving and related crashes include:

- *Sleep loss.*
- *Driving patterns*, including driving between midnight and 6 a.m.; driving a substantial number of miles each year and/or a substantial number of hours each day; driving in the midafternoon hours (especially for older persons); and driving for longer times without taking a break.
- *Use of sedating medications*, especially prescribed anxiolytic hypnotics, tricyclic antidepressants, and some antihistamines
- *Untreated or unrecognized sleep disorders*, especially sleep apnea syndrome (SAS) and narcolepsy.
- *Consumption of alcohol*, which interacts with and adds to drowsiness.

These factors have cumulative effects; a combination of them substantially increases crash risk.

POPULATION GROUPS AT HIGHEST RISK

Although no driver is immune, the following three population groups are at highest risk, based on evidence from crash reports and self-reports of sleep behavior and driving performance.

- Young people (ages 16 to 29), especially males.
- Shift workers whose sleep is disrupted by working at night or working long or irregular hours.
- People with untreated sleep apnea syndrome (SAS) and narcolepsy.

COUNTERMEASURES

To prevent drowsy driving and its consequences, Americans need information on approaches that may reduce their risks. The public needs to be informed of the benefits of specific behaviors that help avoid becoming drowsy while driving. Helpful behaviors include (1) planning to get sufficient sleep, (2) not drinking even small amounts of alcohol when sleepy, and (3) limiting driving between midnight and 6 a.m. As soon as a driver becomes sleepy, the key behavioral step is to stop driving-for example, letting a passenger drive or stopping to sleep before continuing a trip. Two remedial actions can make a short-term difference in driving alertness: taking a short nap (about 15 to 20 minutes) and consuming caffeine 000006
44 equivalent to two cups of coffee. The effectiveness of any other steps to improve alertness when sleepy, such as opening a window or listening to the radio, has not been demonstrated.

A more informed medical community could help reduce drowsy driving by talking to patients about the need for adequate sleep, an important behavior for good health as well as drowsy-driving prevention. The detection and management of illnesses that can cause sleepiness, such as SAS and narcolepsy, are other health care-related countermeasures.

Information could be provided to the public and policymakers about the purpose and meaning of shoulder rumble strips, which alarm or awaken sleepy drivers whose vehicles are going off the road. These rumble strips placed on high-speed, controlled-access, rural roads reduce drive-off-the-road crashes by 30 to 50 percent. However, rumble strips are not a solution for sleepy drivers, who must view any wake-up alert as an indication of impairment-a signal to stop driving and get adequate sleep before driving again.

Employers, unions, and shift work employees need to be informed about effective measures they can take to reduce sleepiness resulting from shift work schedules. Countermeasures include following effective strategies for scheduling shift changes and, when shift work precludes normal nighttime sleep, planning a time and an environment to obtain sufficient restorative sleep.

FOCUSING AN EDUCATIONAL CAMPAIGN: PANEL RECOMMENDATIONS

To assist the educational campaign in developing its educational initiatives, the panel recommended the following three priority areas:

1. Educate young males (ages 16 to 24) about drowsy driving and how to reduce lifestyle- related risks.
2. Promote shoulder rumble strips as an effective countermeasure for drowsy driving; in this context, raise public and policymaker awareness about drowsy-driving risks and how to reduce them.
3. Educate shift workers about the risks of drowsy driving and how to reduce them.

The panel also identified complementary messages for the campaigns and called for the active involvement of other organizations in an effort to promote sufficient sleep-as a public health benefit as well as a means to reduce the risk of fall-asleep crashes.

I. INTRODUCTION

In the 1996 appropriations bill for the U.S. Department of Transportation, the Senate Appropriations Committee report noted that "NHTSA data indicate that in recent years there have been about 56,000 crashes annually in which driver drowsiness/fatigue was cited by police. Annual averages of roughly 40,000 nonfatal injuries and 1,550 fatalities result from these crashes. It is widely recognized that these statistics underreport the extent of these types of crashes. These statistics also do not deal with crashes caused by driver inattention, which is believed to be a larger problem."

In response, Congress allocated funds for a public education campaign on drowsy driving among noncommercial drivers, to be sponsored by the National Highway Traffic Safety Administration (NHTSA) and the National Center on Sleep Disorders Research (NCSDR) of the National Heart, Lung, and Blood Institute, the National Institutes of Health. This focus complements Federal Highway Administration efforts to address the problem

45 among commercial vehicle drivers (Federal Register, 1996).

To provide evidence-based direction to this campaign, the Expert Panel on Driver Fatigue and Sleepiness reviewed the research conducted to date on drowsy-driving crashes. The resulting report outlines the following:

- The biology of human sleep and sleepiness, which physiologically underlies crash risk.
- Common characteristics of crashes related to drowsy driving and sleepiness.
- Risks for crashes attributed to drowsy driving.
- Population groups at highest risk.
- Effective countermeasures used to prevent drowsy driving and related crashes.

In addition to summarizing what is known-and what remains unknown-from sleep and highway safety research, the report also presents the panel's recommendations for the highest priority target audiences and educational message points for the NCSDR/NHTSA campaign.

METHODS AND KNOWLEDGE BASE OF THIS REPORT

The panel conducted a wide-ranging search for information on sleep, circadian rhythms, sleepiness, drowsiness, sleep physiology, and sleep disorders, as well as on the association of these topics with driving risk and crash prevention. The panel conducted literature searches of online databases in traffic safety, medicine, and physiology using the keywords listed above and following suggestions for linkage to related topics (e.g., technology, alerting devices, industrial accidents, and shift work). In addition, the panel requested or was forwarded formal and informal reviews and monographs by Federal, State, and nongovernmental agencies. Although there was no formal ranking of the scientific rigor of all this material, original papers, reviews, monographs, and reports selected for citation reflect the higher levels of evidence available on the topic and literature upon which the major concepts or opinions of the panel report are based. The references provided do not, however, reflect all resources available or reviewed by the panel; when possible, more recent material or reviews are preferentially cited.

The principal types of primary data the panel used fall into the following categories:

- Studies of crash data that identify the characteristics of crashes in which the driver was reported by police to have fallen asleep and the characteristics of the sleepy driver.
- Self-reports from drivers involved in crashes (with data collected either at the crash scene or retrospectively) that gather information on driver behavior preceding the crash or relevant work, sleep, and other lifestyle habits.
- Population surveys that relate driver factors to fall-asleep or drowsy-driving crashes or to risky behavior associated with crashes.
- Laboratory studies using a driver simulator or other fundamental tests that relate the effects on performance of sleepiness, sleep loss, and the combined effects of sleep loss and alcohol consumption.
- Laboratory studies using a driver simulator or performance tests that examine the performance of persons with sleep disorders compared with a control group.
- Retrospective studies that compare crash histories of drivers with sleep disorders with other drivers.
- Laboratory and epidemiological studies of drowsy-driving countermeasures.

The literature reviewed had variations in design, method, rigor, populations included, methodological detail, outcome measures, and other variables, all of which precluded a strict comparison. In addition, the number of studies is relatively small, and some of the studies do not represent large

060008

46 numbers of crashes or feature crash numbers or frequency as an outcome measure.

RESEARCH NEEDS

The panel identified three major categories in which more evidence is needed:

*Quantification of the problem.* To allow accurate estimates of the true prevalence of drowsy-driving crashes, it will be important to develop a standard manner by which law enforce- ment officers can assess and report crashes resulting from drowsy driving. Currently, States use different definitions and have varying reporting requirements, which hinder quantification. However, this is not just a reporting problem; a method for objectively assessing sleepiness at the crash site also would enable better quantification.

*Risks.* More information is needed on chronic and acute risks for drowsy-driving crashes. For example, capturing information on drivers' precrash behaviors (e.g., duration of prior wakefulness, recent sleep-wake patterns, the quality and quantity of sleep, work hours, and work patterns [day shift, night shift, rotating shift]) could enhance understanding of the problems. It is important to learn more about at-risk drivers who do not crash and about the impact of drowsiness on driving at all points on the continuum, from low-level drowsiness to falling asleep at the wheel.

*Countermeasures.* Additional information and research are needed on measures that increase or restore driver alertness or reduce crash risk or incidence. In addition, studies should determine whether early recognition, treatment, and management of sleepiness and sleep disorders reduce crash risk or incidence. Educational approaches that are effective for reaching high-risk audiences will need to be developed and tested; ultimately, the impact of such approaches on drowsy-driving knowledge, attitudes, and behaviors will need to be examined.

II. BIOLOGY OF HUMAN SLEEP AND SLEEPINESS

Sleepiness, also referred to as drowsiness, is defined in this report as the need to fall asleep, a process that is the result of both the circadian rhythm and the need to sleep (see below). Sleep can be irresistible; recognition is emerging that neurobiologically based sleepiness contributes to human error in a variety of settings, and driving is no exception (Åkerstedt, 1995a, 1995b; Dinges, 1995; Horne, 1988; Sharpley, 1996; Martikainen, 1992). In the more recent surveys and reporting of noncommercial crashes, investigators have begun to collect and analyze data for instances in which the driver may have fallen asleep.

The terms "fatigue" and "inattention" are sometimes used interchangeably with sleepiness; however, these terms have individual meanings (Brown, 1994). Strictly speaking, fatigue is the consequence of physical labor or a prolonged experience and is defined as a disinclination to continue the task at hand. In regard to driving, a psychologically based conflict occurs between the disinclination to drive and the need to drive. One result can be a progressive withdrawal of attention to the tasks required for safe driving. Inattention can result from fatigue, but the crash literature also identifies preoccupation, distractions inside the vehicle, and other behaviors as inattention (Treat et al., 1979).

The driving literature before 1985 made little mention of sleepiness and instead focused on the prevention of inattention and fatigue; traffic crash forms did not have a category for reporting sleepiness as a crash cause. Certainly, sleepiness can contribute to fatigue and inattention, and given the lack of objective tests or uniform reporting requirements to distinguish these different crash causes, misclassification and inconsistencies in the primary data and the literature can be expected. Some, but not all, recent studies and reviews make an explicit assumption that given the uncertainty in crash reports, all crashes in the fatigue and inattention categories should be attributed to sleepiness. The panel suspects that sleepiness-related crashes are still very often reported in the categories of fatigue and inattention, and it reached consensus that sleepiness is an underrecognized feature of noncommercial automobile crashes.

The panel concluded that the data on fatigue and inattention provide less support for defining risk factors and high-risk groups than the data on sleepiness or drowsiness. In addition, sleepiness is identifiable, predictable, and preventable.

THE SLEEP-WAKE CYCLE

A body of literature exists on the mechanisms of human sleep and sleepiness that affect driving risks. The sleep-wake cycle is governed by both homeostatic and circadian factors. Homeostasis relates to the neurobiological need to sleep; the longer the period of wakefulness, the more pressure builds for sleep and the more difficult it is to resist (Dinges, 1995). The circadian pacemaker is an internal body clock that completes a cycle approximately every 24 hours. Homeostatic factors govern circadian factors to regulate the timing of sleepiness and wakefulness.

These processes create a predictable pattern of two sleepiness peaks, which commonly occur about 12 hours after the midsleep period (during the afternoon for most people who sleep at night) and before the next consolidated sleep period (most commonly at night, before bedtime) (Richardson et al., 1982; see figure 1). Sleep and wakefulness also are influenced by the light/dark cycle, which in humans most often means wakefulness during daylight and sleep during darkness. People whose sleep is out of phase with this cycle, such as night workers, air crews, and travelers who cross several time zones, can experience sleep loss and sleep disruption that reduce alertness (Åkerstedt, 1995b; Samel et al., 1995).

The panel noted that the sleep-wake cycle is intrinsic and inevitable, not a pattern to which people voluntarily adhere or can decide to ignore. Despite the tendency of society today to give sleep less priority than other activities, sleepiness and performance impairment are neurobiological responses of the human brain to sleep deprivation. Training, occupation, education, motivation, skill level, and intelligence exert no influence on reducing the need for sleep. Micro-sleeps, or involuntary intrusions of sleep or near sleep, can overcome the best intentions to remain awake.

SLEEPINESS IMPAIRS PERFORMANCE

Sleepiness leads to crashes because it impairs elements of human performance that are critical to safe driving (Dinges, Kribbs, 1991). Relevant impairments identified in laboratory and in-vehicle studies include:

- *Slower reaction time*. Sleepiness reduces optimum reaction times, and moderately sleepy people can have a performance-impairing increase in reaction time that will hinder stopping in time to avoid a collision (Dinges, 1995). Even small decrements in reaction time can have a profound effect on crash risk, particularly at high speeds.
- *Reduced vigilance*. Performance on attention-based tasks declines with sleepiness, including increased periods of nonresponding or delayed responding (Haraldsson et al., 1990; Kribbs, Dinges, 1994) (see figure 2).
- *Deficits in information processing*. Processing and integrating information takes longer, the accuracy of short-term memory decreases, and performance declines (Dinges, 1995).

Often, people use physical activity and dietary stimulants to cope with sleep loss, masking their level of sleepiness. However, when they sit still, perform repetitive tasks (such as driving long distances), get bored, or let down their coping defenses, sleep comes quickly (Mitler et al., 1988; National Transportation Safety Board, 1995).

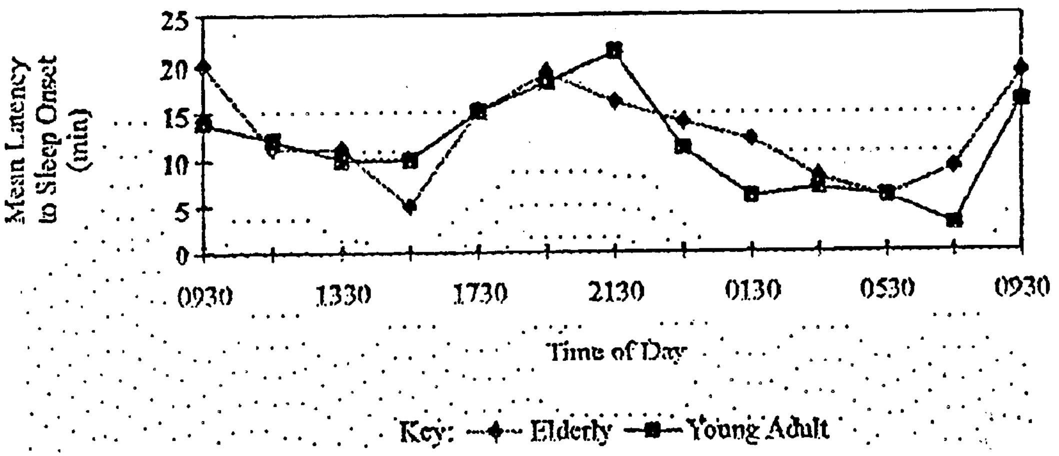

Figure 1. Latency to sleep at 2-hour intervals across the 24-hour day. Testing during the daytime followed standard Multiple Sleep Latency Test procedures. During the night, from 2330 to 0800 hours (based on a 24-hour clock), subjects were awakened every 2 hours for 15 minutes, and latency of return to sleep was measured. Elderly subjects (n = 10) were 60 to 83 years of age; young subjects (n = 8) were 19 to 23 years of age (Carskadon and Dement, 1987).

49 000011

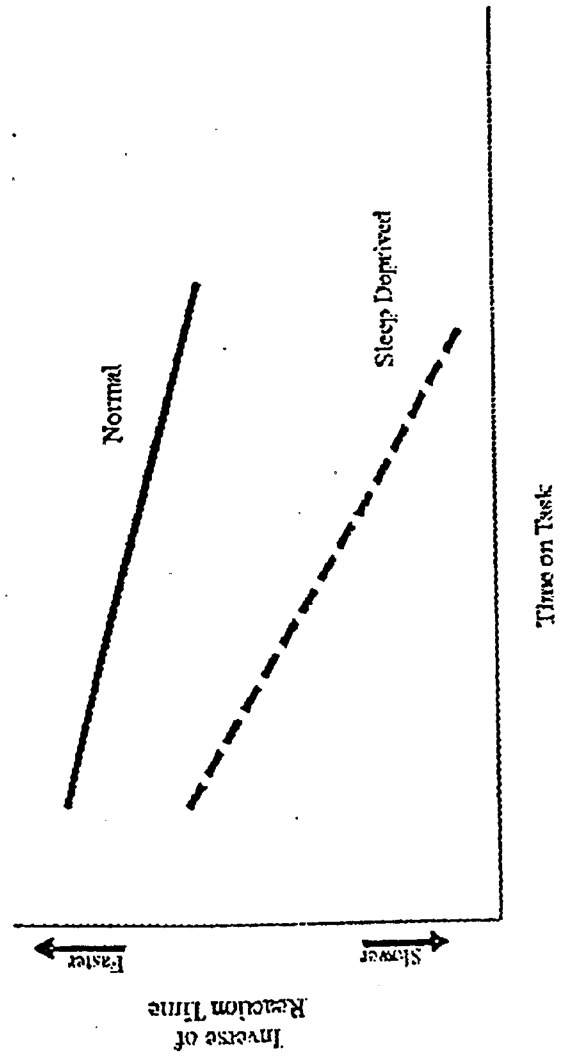
Figure 2. Performance slows with sleep deprivation. A summary of data (Kribbs; Dinges, 1994) on reaction to an event marker presented to a subject 09915605.111101 of sleep loss are cumulative (Carskadon, Dement, 1981). Regularly losing 1 to 2 hours of sleep a night can create a "sleep debt" and lead to chronic sleepiness over time. Only sleep can reduce sleep debt. In a recent study, people whose sleep was restricted to 4 to 5 hours per night for 1 week needed two full nights of sleep to recover vigilance, performance, and normal mood (Dinges et al., 1997).

Both external and internal factors can lead to a restriction in the time available for sleep. External factors, some beyond the individual's control, include work hours, job and family responsibilities, and school bus or school opening times. Internal or personal factors sometimes are involuntary, such as a medication effect that interrupts sleep. Often, however, reasons for sleep restriction represent a lifestyle choice-sleeping less to have more time to work, study, socialize, or engage in other activities.

*Job-Related Sleep Restriction.* Contemporary society functions 24 hours a day. Economic pressures and the global economy place increased demands on many people to work instead of sleep, and work hours and demands are a major cause of sleep loss. For example, respondents to the New York State survey who reported drowsy-driving incidents cited a variety of reasons related to work patterns. These included working more than one job, working extended shifts (day plus evening plus night), and working many hours a week (McCartt et al., 1996).

*Personal Demands and Lifestyle Choices.* Many Americans do not get the sleep they need because their schedules do not allow adequate time for it. Juggling work and family responsibilities, combining work and education, and making time for enjoyable pastimes often leave little time left over for sleeping. Many Americans are unaware of the negative effects this choice can have on health and functioning (Mitler et al., 1988). F rom high-profile politicians and celebrities to the general population, people often see sleep as a luxury. One in four respondents who reported sleeping difficulties in a recent Gallup Survey said you cannot be successful in a career and get enough sleep (National Sleep Foundation, 1995).

*Sleep fragmentation.* Sleep is an active process, and adequate time in bed does not mean that adequate sleep has been obtained. Sleep disruption and fragmentation cause inadequate sleep and can negatively affect functioning (Dinges, 1995). Similar to sleep restriction, sleep fragmentation can have internal and external causes. The primary internal cause is illness, including untreated sleep disorders. Externally, disturbances such as noise, children, activity and lights, a restless spouse, or job-related duties (e.g., workers who are on call) can interrupt and reduce the quality and quantity of sleep. Studies of commercial vehicle drivers present similar findings. For example, the National Transportation Safety Board (1995) concluded that the critical factors in predicting crashes related to sleepiness (which this report called "fatigue") were duration of the most recent sleep period, the amount of sleep in the previous 24 hours, and fragmented sleep patterns.

*Circadian factors.* As noted earlier, the circadian pacemaker regularly produces feelings of sleepiness during the afternoon and evening, even among people who are not sleep deprived (Dinges, 1995). Shift work also can disturb sleep by interfering with circadian sleep patterns.

EVALUATING SLEEPINESS

An ideal measure of sleepiness would be a physiologically based screening tool that is rapid and suitable for repeated administration (Mitler, Miller, 1996). No measures currently exist for measuring sleepiness in the immediacy of crash situations. Furthermore, a crash is likely to be an altering circumstance. A measuring system would be performance based and in vehicle, linked to alerting devices designed to prevent the driver from falling asleep.

The current tools for the assessment of sleepiness are based on questionnaires and electrophysiological measures of sleep, and there is interest in vehicle-based monitors. A comprehensive review of these efforts is beyond the scope of the present report. In the following brief discussion, some tools for the assessment of sleepiness are described to illustrate the different subjective and objective measures of chronic and situational (acute) sleepiness and the vehicle-based technology to sense sleepiness.

*Assessment for chronic sleepiness.* The Epworth Sleepiness Scale (ESS) (Johns, 1991) is an eight-item, self-report measure that quantifies individuals' sleepiness by their tendency to fall asleep "in your usual way of life in recent times" in situations like sitting and reading, watching TV, and sitting in a car that is stopped for traffic. People scoring 10 to 14 are rated as moderately sleepy, whereas a rating of 15 or greater indicates severe sleepiness. The ESS is not designed to be used to assess situational sleepiness or to measure sleepiness in response to an acute sleep loss. The ESS has been used in research on driver sleepiness and in correlations of sleepiness to driving performance in people with medical disorders.

Other rating tools that measure an individual's experience with sleepiness over an extended period of time and contain a component or scale that is congruent with measuring sleepiness include the Pittsburgh Sleep Quality Index (Buysse et al., 1989) and the Sleep-Wake Activity Inventory (Rosenthal et al., 1993b). Other self-report instruments obtain historical information pertinent to sleepiness using patient logs and sleep-wake diaries (Douglas et al., 1990) and the Sleep Disorders Questionnaire (Douglas et al., 1994). The information gathered with these instruments has not been as widely applied to assessments of noncommercial crashes.

Laboratory tools for measuring sleepiness include the Multiple Sleep Latency Test (MSLT) (Carskadon et al., 1986; Carskadon, Dement, 1987) and the Maintenance of Wakefulness Test (MWT) (Mitler et al., 1982). The MSLT mea- sures the tendency to fall asleep in a standardized sleep-promoting situation during four or five 20-minute nap opportunities that are spaced 2 hours apart throughout the day and in which the individual is instructed to try to fall asleep. Sleep is determined by predefined brain wave sleep-staging criteria. The presumption under-lying this test is that people who fall asleep faster are sleepier. Individuals who fall asleep in 5 minutes or less are considered pathologically sleepy; taking 10 minutes or more to fall asleep is considered normal. In the MWT, individuals are instructed to remain awake, and the time it takes (if ever) in 20 minutes to fall asleep by brain wave criteria is the measure of sleepiness.

Although the relative risk for fall-asleep crashes has not been established, individuals who exhibit a sleep latency of less than 15 minutes on the MWT are categorically too sleepy to drive a motor vehicle (Mitler, Miller, 1996).

The MSLT and MWT were developed for neuro- physiologic assessment and are sensitive to acute as well as chronic sleep loss. Both assume standardization of procedures involving specially trained personnel and are not valid if the individual being tested is ill or in pain (Carskadon, 1993b). The panel thought that the use of these medical tests may not be practical for crash assessment; however, the use of a modified "nap test" has been used along with questionnaires for field assessment of driver sleepiness (Philip et al., 1997).

*Assessment for acute sleepiness.* Acute sleepiness is defined as a need for sleep that is present at a particular point in time. The Stanford Sleepiness Scale (SSS) (Hoddes et al., 1973) is an instrument that contains seven statements through which people rate their current level of alertness (e.g., 1= "feeling...wide awake" to 7= "...sleep onset soon..."). The scale correlates with standard performance measures, is sensitive to sleep loss, and can be administered repeatedly throughout a 24-hour period. In some situations, the scale does not appear to correlate well with behavioral indicators of sleepiness; in other words, people with obvious signs of sleepiness have chosen ratings 1 or 2.

The Karolinska Sleep Diary (Åkerstedt et al., 1994) contains questions relating to self-reports of the quality of sleep. Laboratory and some field studies suggest that most subjective sleep measures in this scale show strong covariation and relation to sleep continuity across a wide spectrum of prior sleep length and fragmentation. As in the SSS, several questions are asked to determine values for subjective sleepiness.

52 06:0014

10121L"60516660

4/MCH

A Visual Analogue Scale (VAS) for sleepiness permits the subjects to rate their "sleepiness" in a continuum along a 100-mm line (Wewers, Low, 1990). Anchors for sleepiness range from "just about asleep" (left end) to "as wide awake as I can be" (right end). Persons rate their current feelings by placing a mark on the line that indicates how sleepy they are feeling. The VAS is scored by measuring the distance in millimeters from one end of the scale to the mark placed on the line. The VAS is convenient and rapidly administered over repeated measurements.

In all these attempts to measure subjective sleepiness, a person's response is dependent on both the presentation of the instructions and the subject's interpretation of those instructions. Problems related to these factors may confound interpretation between studies and between groups of different ages or cultures.

*Vehicle-based tools*. There are some in-vehicle systems that are intended to measure sleepiness or some behavior associated with sleepiness in commercial and noncommercial driving. Examples include brain wave monitors, eye-closure monitors, devices that detect steering variance, and tracking devices that detect lane drift (Dinges, 1995). This technology is currently being examined in physiologic, psychophysiologic, and crash-prevention domains. There is insufficient evidence at present to judge its application and efficacy in regard to noncommercial driving.

III. CHARACTERISTICS OF DROWSY-DRIVING CRASHES

DIN

As noted in section II, unlike the situation with alcohol-related crashes, no blood, breath, or other objective test for sleepiness currently exists that is administered to a driver at the scene of a crash. No definitive criteria are available for establishing how sleepy a driver is or a threshold at which driver sleepiness affects safety. If drivers are unharmed in a crash, hyperarousal following the crash usually eliminates any residual impairment that could assist investigating officers in attributing a crash to sleepiness.

As a result, our understanding of drowsy-driving crashes is based on subjective evidence, such as police crash reports and driver self-reports following the event, and may rely on surrogate mea- sures of sleepiness, such as duration of sleep in a recent timeframe or sleep/work patterns. Some researchers have addressed the problem by analyzing only those crashes known not to be caused by alcohol (because alcohol can cause sleepiness and affect other performance variables), mechanical problems, or other factors and by looking for evidence of a sleepiness effect in categories of inattention or fatigue. Thus, reports on drowsy driving are often inferential. The strength of the inferences is increased when different types of studies reach similar conclusions.

The characteristics of drowsy-driving crashes reported below resemble the inclusion criteria that some researchers have used to define a crash as having been caused by drowsiness. This similarity suggests the possibility that the researchers' initial assumptions influenced the determination of crash characteristics. Despite these caveats, a fairly clear picture emerges from studies conducted to date of the typical crash related to sleepiness.

*The problem occurs during late-night hours.* Drowsy-driving crashes occur predominantly after midnight, with a smaller secondary peak in the midafternoon (Studies of police crash reports: Pack et al., 1995; Knipling, Wang, 1994; New York State GTSC Sleep Task Force, 1994; New York State Task Force on Drowsy Driving, 1996; Langlois et al., 1985; Lavie et al., 1986; Mitler et al., 1988; Horne, Reyner 1995b; Studies based on driver self-reports: Maycock, 1996; McCartt et al., 1996). Studies of commercial drivers show a similar pattern (see figure 3). According to a 1996 report, time of day was the most consistent factor influencing driver fatigue and alertness. Driver drowsiness was markedly greater during night driving than during daytime driving, with drowsiness peaking from late evening until dawn (Wylie et al., 1996). Nighttime and midafternoon peaks are consistent with human circadian sleepiness patterns.

53 000015

The risk of a crash related to sleepiness increases during nighttime hours among both younger drivers (25 years of age and younger) and drivers between the ages of 26 and 45. However, younger drivers have no increased risk during the afternoon, when the predictable circadian sleepiness peak is expected. Drivers ages 45 through 65 have fewer nighttime crashes, with a peak at 7 a.m. Drivers ages older than 65 are more likely to have fall-asleep crashes during the midafternoon (Pack et al., 1995; Wang, Knipling, Goodman, 1996).

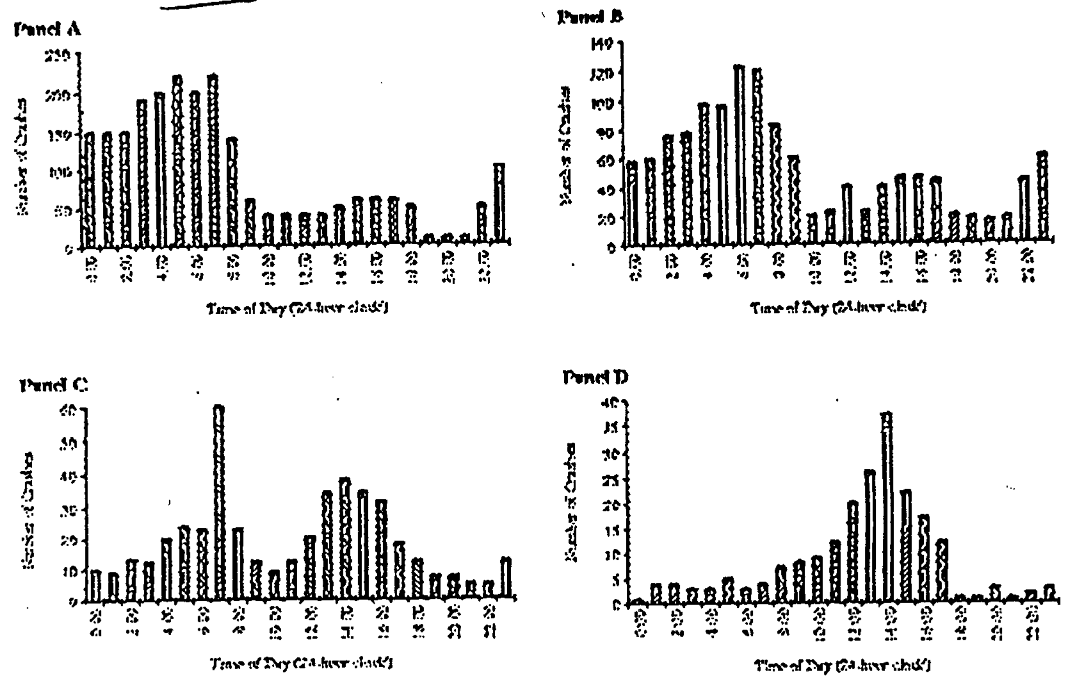

Figure 3. Time of occurrence of crashes in drivers of different ages in which the crashes were attributed by the police to the driver being asleep but in which alcohol was not judged to be involved. The four panels show plots for drivers of the following ages: (A) drivers 25 years of age or younger; (B) drivers between 26 and 45 years of age, inclusive; (C) drivers between 46 and 65 years of age, inclusive; and (D) drivers older than 65 years. In each panel, the X axis is the time of day and the Y axis is the number of crashes. However, the scale of the Y axis is different for each panel. The data are for the years 000016
54

1990 to 1992, inclusive.

*Fall-asleep crashes are likely to be serious.* The morbidity and mortality associated with drowsy-driving crashes are high, perhaps because of the higher speeds involved (Horne, Reyner, 1995b) combined with delayed reaction time. In North Carolina, more of these crashes resulted in injury compared with other, nonalcohol-related crashes-fatalities occurred in 1.4 percent and 0.5 percent, respectively (Pack et al., 1995). Pack (1995) and Maycock (1996) both conclude that a higher proportion of the most serious crashes are sleepiness related.

*A single vehicle leaves the roadway.* An analysis of police crash reports in North Carolina showed the majority of the nonalcohol, drowsy-driving crashes were single-vehicle roadway departures (Pack et al., 1995). Among New York State drivers surveyed about their lifetime experience with drowsy driving, almost one-half of those who had a fall-asleep or drowsy-driving crash reported a single-vehicle roadway departure; about one-fourth of those who had fallen asleep without crashing also reported going off the road (McCartt et al., 1996). NHTSA General Estimates System data reflect the same trend but also suggest that sleepiness may play a role in rear-end crashes and head-on crashes (Knipling, Wang, 1994).

*The crash occurs on a high-speed road.* In comparison with other types of crashes, drowsy-driving crashes more often take place on highways and major roadways with speed limits of 55 to 65 mph (Knipling, Wang, 1994; Wang, Knipling, Goodman, 1996). Pack and colleagues (1995) found that most sleepiness-related crashes occur at higher speeds, attributing this finding to the effect of sleep loss on reaction time. NHTSA figures show that most drowsiness- or fatigue-related crashes occur on higher speed roads in nonurban areas. However, Maycock (1996) found that a greater absolute number occur in built-up areas. Panel members noted the possibility that more crashes occur on high-speed roads because more long-distance nighttime driving occurs on highways.

*The driver does not attempt to avoid crashing.* NHTSA data show that sleepy drivers are less likely than alert drivers to take corrective action before a crash (Wang, Knipling, Goodman, 1996). Anecdotal reports also suggest that evidence of a corrective maneuver, such as skid marks or brake lights, is usually absent in fall-asleep crashes.

*The driver is alone in the vehicle.* In the New York State survey of lifetime incidents, 82 percent of drowsy-driving crashes involved a single occupant (McCartt et al., 1996). Conversely, respondents who reported having fallen asleep without crashing were less likely to have been alone in the automobile.

Wilkins and colleagues (1997) confirmed that crashes attributed to driver fatigue have characteristics similar to those cited above regarding driver age, time of day, crash type, and severity. But, in addition, when alcohol involvement was combined with fatigue or sleepiness, the patterns became more pronounced. For example, "asleep with alcohol" crashes involved a higher percentage of young males than did crashes in which the driver was asleep with no evidence of alcohol.

IV. RISKS FOR DROWSY-DRIVING CRASHES

Although its conclusions were based on a limited body of knowledge, the panel identified a number of chronic predisposing factors and acute situational factors that increase the risk of drowsy driving and drowsy-driving crashes. These include sleep loss, driving patterns that disregard the normal sleep-wake cycle or represent driving increased time or miles (exposure), the use of sedating medication, sleep disorders such as sleep apnea syndrome (SAS) and narcolepsy, and the increased drowsiness and performance impairment that result from consuming alcohol when drowsy. All factors may interact, and with the exception of medical disorders, all factors may have either chronic or acute effects.

SLEEP LOSS

As noted in section II, external and internal factors and current lack of knowledge and attitudes about sleep cause many Americans to get inadequate sleep either occasionally (acute sleepiness) or routinely (chronic sleepiness). Those who suffer chronic sleep restriction and sleepiness may also combine this lifestyle pattern with situational acute sleep loss, aggravating their risk of drowsy driving.

*Chronic sleepiness.* In a recent Gallup survey, approximately one-half of U.S. adults reported experiencing sleeping difficulties sometimes, with about 1 in 10 saying the difficulties are frequent (National Sleep Foundation, 1995). In a 1997 followup survey, three of four Americans who reported getting as much or more sleep than they "need" said they were sleepy during the day. One in three of the adult public was deemed "significantly" sleepy on the Epworth Sleepiness Scale (ESS), and 1 in 20 scored at the "severe" sleepiness level (National Sleep Foundation Survey, 1997).

In the New York State survey, the reported frequency of drowsy driving in the past year was associated with the quantity and quality of sleep obtained. For example, those who reported having fair or poor sleep quality were more likely to have driven drowsy sometimes or very often than were those who said their sleep was good or excellent (McCartt et al., 1996).

In addition, Maycock (1996) found that higher scores on the ESS were positively associated with crashes. Drivers who reported having trouble staying awake during the day were more likely to report having sometimes or very often driven drowsy (McCartt et al., 1996).

*Acute sleep loss.* As discussed in section II, the loss of even one night of sleep may cause extreme sleepiness. Short-term work demands, child care, socializing, preparing for a trip or vacation, and "pulling all nighters" are common causes of acute sleep loss.

*Sleep-restrictive work patterns.* Working the night shift, overtime, or rotating shifts is a risk for drowsy driving that may be both chronic and acute. In the New York State survey, nearly one-half the drowsy drivers who crashed (and more than one-third of those who drove drowsy without crashing) reported having worked the night shift or overtime prior to the incident. In addition, a higher reported frequency of driving drowsy was associated with working a rotating shift, working a greater number of hours per week, and more frequently driving for one's job (McCartt et al., 1996). In the British study (Maycock, 1996), respondents said that working the night shift led to sleepiness while driving, and in many studies a majority of shift workers admit having slept involuntarily on the night shift. The return to day work and morning shifts starting between 4 a.m. and 7 a.m. also may lead to sleepiness. EEG studies of sleep in rotating shift workers in both the natural environment and the laboratory have shown that day sleep after night work and early night sleep before morning work (e.g., going to sleep at 7 or 8 p.m. before a 4 a.m. shift) is 2 to 4 hours shorter than night sleep (Åkerstedt, 1995a). *A [illegible] TOO' 12 HRS STRAIGHT In addition, a study of hospital house staff working around the clock (Marcus, Loughlin, 1996) found higher levels of sleepiness and crashes following on-call periods. In a survey of hospital nurses, night nurses and rotators were more likely than nurses on other shifts to report nodding off at work and at the wheel and having had a driving mishap on the way home from work (Gold et al., 1992). (For more on this topic, see section V on shift workers.)

DRIVING PATTERNS

* COLD, DARK, ALONE, 12-14 HRS STRAIGHT 56 000018

09951509.112101

Driving patterns, including both time of day and amount of time driven, can increase crash risk. As detailed in section III, the greatest proportion of drowsy-driving crashes occurs during the late-night hours. The biology of the sleep-wake cycle predicts sleepiness during this time period, which is a circadian sleepiness peak and a usual time of darkness. Other driving time patterns that increase risk include driving a larger number of miles each year and a greater number of hours each day (McCartt et al., 1996) and driving a longer time without taking a break or, more often, driving for 3 hours or longer (Maycock, 1996).

THE USE OF SEDATING MEDICATIONS

A number of studies indicate that using certain medications increases the risk of sleepiness-related crashes, particularly using prescribed benzodiazepine anxiolytics, long-acting hypnotics, sedating antihistamines (H1 class), and tricyclic antidepressants (Kozena et al., 1995; Van Laar et al., 1995; Ray et al., 1992; Leveille et al., 1994; Ceutel, 1995; Gengo, Manning, 1990). The risks are higher with higher drug doses and for people taking more than one sedating drug simultaneously (Ray et al., 1992). Younger males have higher risks than do females or other age groups across all drug classes. It appears that risk is highest soon after the drug regimen is initiated and falls to near normal after several months (Ceutel, 1995). Recreational drug use also may exacerbate sleepiness effects (Kerr et al., 1991).

UNTREATED SLEEP DISORDERS: SLEEP APNEA SYNDROME AND NARCOLEPSY

Untreated sleep apnea syndrome and narcolepsy increase the risk of automobile crashes (Findley et al., 1995; George et al., 1987; Aldrich, 1989; Alpert et al., 1992; Broughton et al., 1981; Broughton et al., 1984). No current data link other sleep disorders with drowsy-driving crashes. However, other medical disorders causing disturbed sleep and excessive daytime sleepiness could pose risks.

In sleep apnea syndrome, brief interruptions of air flow and loss of oxygen during sleep disrupt and fragment sleep. The condition also is associated with loud, chronic snoring. Although people with untreated sleep apnea syndrome may not be aware of the brief disturbances, poor sleep quality often leads to daytime sleepiness. Narcolepsy is a disorder of the sleep-wake mechanism that also causes excessive daytime sleepiness. In untreated patients, involuntary 10- to 20-minute naps are common at 2- to 3-hour intervals throughout the day. Cataplexy, a sudden loss of muscle tone ranging from slight weakness to complete collapse, is another major symptom of narcolepsy that increases the risk of crash. These conditions are unrecognized and untreated in a substantial number of people (National Sleep Foundation Survey, 1997; American Thoracic Society, 1994). (See section V for more information on sleep apnea syndrome and narcolepsy.)

CONSUMPTION OF ALCOHOL INTERACTS WITH SLEEPINESS TO INCREASE DROWSINESS AND IMPAIRMENT

Although sleepiness and alcohol are distinct crash causes, the data also show some evidence of overlap. NHTSA found that drivers had consumed some alcohol in nearly 20 percent of all sleepiness-related, single-vehicle crashes (Wang, Knipling, Goodman, 1996). More than one in three New York State drivers surveyed in drowsy-driving crashes said they had drunk some alcohol (McCartt et al., 1996), and police-reported, fall-asleep crashes had a higher proportion of alcohol involvement than other types of crashes in that State. (New York GTSC Task Force, 1994; New York State Task Force, 1996).

Laboratory studies explain and predict these patterns. Many researchers have shown that sleepiness and alcohol interact, with sleep restriction exacerbating the sedating effects of alcohol, and the combination adversely affecting psychomotor skills to an extent greater than that of sleepiness or alcohol alone (Roehrs et al. 1994; Wilkinson, 1968; Huntley, Centybear, 1974; Peeke et al., 1980). Driving simulation tests specifically show this

57 effect, even with modest reductions in sleep, low alcohol doses, and low blood ethanol concentrations. In a driving simulation study, alcohol levels below the legal driving limit produced a greater number of deviations from the road after 4 hours of sleep than after 8 hours of sleep (Roehrs et al., 1994) (see figure 4).

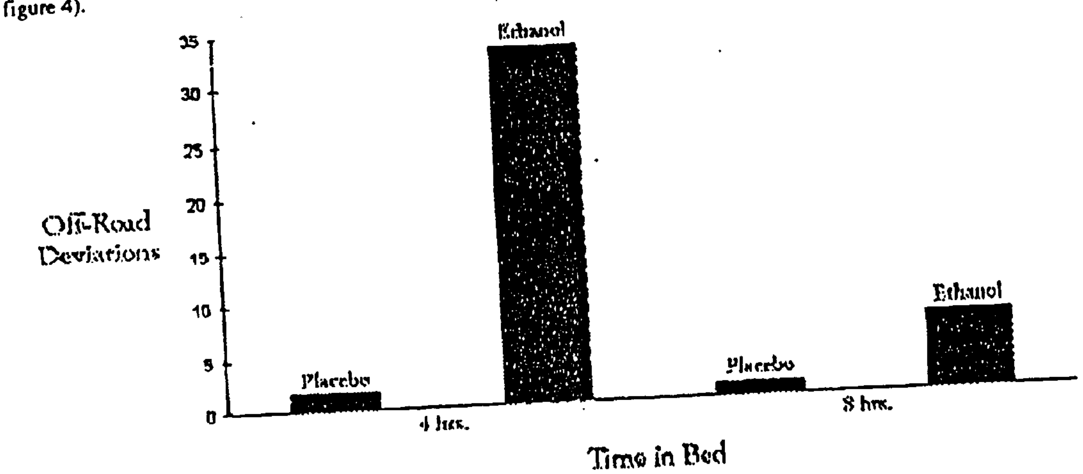

Figure 4. Interaction between alcohol and sleepiness. These data from Roehrs et al. (1994) were collected in a laboratory using a driving simulator. Studies were performed in the morning after either 8 hours or 4 hours of time in bed the previous night and with either a low dose of ethanol or placebo. The number of off-road deviations by the driver was 4 times higher after 8 hours of sleep time but 15 times higher with only 4 hours of sleep time.

It is possible that the effects of low levels of blood alcohol may have an interaction with circadian rhythms that produces sleepiness in the afternoon and evening (Roehrs et al., 1994; Home, Baumber, 1991; Home, Gibbons, 1991). The panel speculated that drinking alcohol before driving in the afternoon or at night might pose special risks given the circadian effects.

INTERACTIONS AMONG FACTORS INCREASE OVERALL RISK

Some of the crash-related factors have been studied more than others. The panel could not find evidence to determine whether chronic or acute situations pose the greater risk for crashes. However, it is clear that these factors are cumulative, and any combination of chronic and acute factors substantially increases crash risk. For example, people with chronic sleep loss who drive in the early morning hours are likely to be at greater risk than are early morning drivers who slept well the night before and usually get enough sleep.

58 0G0020

V. POPULATION GROUPS AT HIGHEST RISK

All drivers who experience the chronic or acute situations described in section IV are at risk for drowsy driving and drowsy-driving crashes. Although no one is immune from risk, research to date clearly identifies three broad population groups at high risk for drowsy-driving crashes. Their higher risk is based on (1) evidence from crash data of a greater absolute or relative number of fall-asleep crashes and/or (2) increased intermediate risk, based on subjective reports of their having higher levels of sleepiness and more of the chronic or acute factors that underlie risk for everyone. The three groups at high risk are young people, shift workers, and people with untreated sleep conditions.

YOUNG PEOPLE, ESPECIALLY YOUNG MEN

Virtually all studies that analyzed data by gender and age group found that young people, and males in particular, were the most likely to be involved in fall-asleep crashes (Pack et al., 1995; Horne, Reyner, 1995b; Maycock, 1996; Knipling, Wang, 1994). Definitions of "young" differed among authors; the ages included in this category fell between 16 and 29.

*Young people.* Knipling and Wang (1995) found that drivers younger than 30 accounted for almost two-thirds of drowsy-driving crashes, despite representing only about one-fourth of licensed drivers. These drivers were four times more likely to have such a crash than were drivers ages 30 years or older. In Pack and colleagues' study (1995), 20 was the peak age of occurrence of drowsy-driving crashes, whereas in New York State the greatest number of drowsy drivers (on self-report) were within the 25-to-34 age group (McCartt et al., 1996), and both the 18-to-24 and 25-to-39 age groups were overrepresented in fall-asleep crashes (New York State Task Force, 1996).

Horne and Reyner (1995a) suggest that a combination of having more of the chronic and acute risk factors and frequently being on the roads during nighttime hours (greater exposure) may explain the greater incidence of drowsiness-related crashes in youth. Carskadon (1990) offers a variety of age-specific reasons for the involvement of younger people, particularly adolescents. During this period, young people are learning to drive, experimenting and taking risks, and testing limits. At the same time, this age group is at risk for excessive sleepiness because of the following:

- Maturational changes that increase the need for sleep.
- Changes in sleep patterns that reduce nighttime sleep or lead to circadian disruptions.
- Cultural and lifestyle factors leading to insufficient sleep, especially a combination of schoolwork demands and part-time jobs, extracurricular activities, and late-night socializing. In one study (Carskadon, 1990), boys with the greatest extracurricular time commitments were most likely to report falling asleep at the wheel. The subgroup at greatest risk comprised the brightest, most energetic, hardest working teens.

The panel felt that vulnerability may be further increased when young people use alcohol or other drugs because sleepy youth are likely to be unaware of the interaction of sleepiness and alcohol and may not recognize related impairments they experience.

*Males.* In North Carolina, males were found to be at the wheel in about three of four fall-asleep crashes (Pack et al., 1995). NHTSA data show that males are 5 times more likely than females to be involved in drowsy-driving crashes (Wang, Knipling, Goodman, 1996). The reasons young males have more crashes than do young females are not clear because both young men and young women are likely to be chronically sleep-deprived.

SHIFT WORKERS 59 0C0021

TOT2TT'60ST6660

Most shift workers have at least occasional sleep disturbances, and approximately one-third complain of fatigue (Åkerstedt, 1995a, 1995b, 1995c). Older shift workers appear to have more sleep-related difficulties than do younger workers, but no gender differences have been found (Harma, 1993). Night shift workers typically get 1.5 fewer hours of sleep per 24 hours as compared with day workers. The midnight to 8 a.m. shift carries the greatest risk of sleep disruption because it requires workers to contradict circadian patterns in order to sleep during the day (Kessler, 1992).

Investigations have demonstrated that circadian phase disruptions caused by rotating shift work are associated with lapses of attention, increased reaction time, and decreased performance (Dinges et al., 1987; Hamilton et al., 1972; Williams et al., 1959). A study of hospital nurses reached similar conclusions based on "real world" experiences. Rotating shifts (working four or more day or evening shifts and four night shifts or more within a month) caused the most severe sleep disruptions of any work schedule. Nurses on rotating schedules reported more "accidents" (including auto crashes, on-the-job errors, and on-the-job personal injuries due to sleepiness) and more near-miss crashes than did nurses on other schedules (Gold et al., 1992). About 95 percent of night nurses working 12-hour shifts reported having had an automobile accident or near-miss accident while driving home from night work (Novak, Auvil-Novak, 1996).

Hospital interns and residents routinely lose sleep during on-call periods, which may last 24 hours or more. A survey of house staff at a large urban medical school found that respondents averaged 3 hours of sleep during 33-hour on-call shifts, much of which was fragmented by frequent interruptions (Marcus, Loughlin, 1996). About 25 percent reported that they had been involved in a motor vehicle crash, 40 percent of which occurred while driving home from work after an on-call night. Others reported frequently falling asleep at the wheel without crashing, for example, while stopped at a traffic light.

Although this evidence does not demonstrate a conclusive association between shift work and crashes, the panel believes that shift workers' increased risks for sleepiness are likely to translate into an increased risk for automobile crashes. Competing demands from family, second jobs, and recreation often further restrict the hours available for sleep and further disrupt the sleep schedule.

The panel also designated shift workers as a high-risk group because the number of people who perform shift work-and are thus exposed to crash risk-is increasing. This sector is growing at a rate of 3 percent per year, as businesses such as overnight deliveries, round-the-clock computer operations, overnight cleaning crews, 24-hour markets, and continuous-operation factories prosper and expand. Currently about one in five men (20.2 percent) and almost one in six women (15 percent) work other than a daytime shift, including evening, night, rotating, split, and irregular shifts (Kessler, 1992).

PEOPLE WITH UNTREATED SLEEP APNEA SYNDROME AND NARCOLEPSY

Although the absolute number of crashes is low, crash risk is increased among people with untreated sleep apnea syndrome (SAS) and narcolepsy. The proportion of crashes is higher for people with untreated narcolepsy than it is for people with untreated SAS. However, because SAS is more common than narcolepsy, the absolute number of crashes is higher for those with untreated SAS (Aldrich, 1989). In addition, patients with untreated SAS or narcolepsy perform less well on driving simulation and vigilance or attention tests than do people without these disorders (Findley, 1995; American Thoracic Society, 1994; Haraldsson et al., 1990). Undiagnosed sleep-disordered breathing, ranging from habitual snoring to repeated breathing interruptions, also increases the likelihood of crashes in a dose-response manner (Stradling et al., 1991; Philip et al., 1996; Hanning, Welch, 1996; Ohayon, Priest, Caulet, et al., 1997).

Although these conditions place people at higher risk for drowsy-driving crashes, they are not invariably linked with impaired driving. For example, many people with these disorders report no auto crashes (Findley et al., 1988; Aldrich, 1989). Findley and colleagues (1989) found that patients with severe untreated sleep apnea had more frequent crashes than did those with untreated mild apnea. A patient who can recognize impending uncontrollable sleepiness and take precautions is less likely to be at risk than one who is unaware of or denies his or her sleepiness (Aldrich, 1989).

Sleep apnea syndrome is somewhat more common among males than among females, and typical patients tend to be overweight and middle aged or older, with a large collar size and history of loud snoring; however, women and men without this profile also have the disorder (American Thoracic Society, 1994). People with narcolepsy are as likely to be female as male, and the disorder usually begins in adolescence. The time from onset of symptoms to diagnosis of narcolepsy averages 10 years (American Thoracic Society, 1994; National Commission on Sleep Disorders Research, 1993). Currently, many people with these conditions are undiagnosed and untreated, unaware of the potentially serious consequences of driving while drowsy, or unaware of the seriousness of the difficulty they may experience in maintaining alertness (Arbus et al., 1991; Hansotia, 1997). Falling asleep at the wheel may be a major factor that motivates undiagnosed patients to seek medical care. The matter is rarely raised in driver or law enforcement education, and even health care professionals may not recognize a history of sleepiness as a risk factor for fall-asleep crashes. Medical systems have been successful in identifying only a fraction of the population with symptomatic sleep apnea (Strohl, Redline, 1996).

VI. COUNTERMEASURES

The panel reviewed the knowledge base in four categories of countermeasures: behavioral, medical, alerting devices, and shift work. They found only a few scientific evaluations of potential countermeasures, most of which were laboratory studies. Reports that exist tend to address the biological feasibility of reducing drowsiness or improving alertness, rather than demonstrate an intervention that reduces drowsy-driving crashes. As noted earlier, more research is needed on this topic.

Countermeasures for drowsy driving aim either to prevent it or to ameliorate it after it occurs. The panel concluded that preventing drowsiness with adequate sleep before driving is both easier and much more successful than any remedial measure reviewed. Methods of obtaining adequate sustained sleep include creating a positive sleep environment (a room that is cool, quiet, and dark) and sleeping at regularly scheduled times. Such measures are often promoted as "sleep hygiene" and make intuitive sense; however, few rigorous studies support all sleep hygiene claims.

The panel noted that the wake-up effects from remedial approaches to existing sleepiness do not last long. At best they can help sleepy drivers stay awake and alert long enough to find a motel, call for a ride, or stop driving and sleep. They are not a substitute for good sleep habits and should not be viewed as a "driving strategy" that can get drowsy drivers safely to their destination.

BEHAVIORAL INTERVENTIONS

In addition to getting adequate sleep before driving, drivers can plan ahead to reduce the risk of drowsy driving in other ways. Some evidence exists that napping before a long drive may help make up for sleep loss in the short term and enhance wakefulness during the drive. Napping has the greatest effect on performance several hours after the nap (Dinges et al., 1987; Dinges, 1992, 1995). Two other proven interventions avoid known problem situations: not drinking alcohol when sleepy (Roehrs et al., 1994) and not driving between midnight and 6 a.m. (Mitler et al., 1988; Åkerstedt, 1995c), especially well into the period when sleep is usual (Brown, 1994). Graduated driver-licensing programs that disallow late-night driving among younger drivers can mandate this risk-avoiding behavior (Waller, 1989; Frith, Perkins, 1992).

10123111.060T5660

When a driver becomes drowsy, the most obvious behavioral step for avoiding a crash is to stop driving and sleep for an extended period. When this approach is not practical and another driver is not available to take over, studies have found two remedial actions that can make a short-term difference:

*Napping*. Taking a break for a short nap (about 15 to 20 minutes) has been shown to improve subsequent performance, even among sleep-deprived people (Horne, Reyner, 1995a; Dinges et al., 1987; Philip et al., 1997). Naitoh (1992) found that short naps every 6 hours during a 35-hour (otherwise sleepless) period was effective in maintaining performance in the laboratory. However, nappers are often groggy for about 15 minutes upon awakening from naps longer than 20 minutes (Dinges, 1992). Practical issues with this strategy include the inability of some people to take short naps and the need for secure rest areas. The New York State survey found that about one-third of drivers had needed or wanted to stop in the past year, but a rest area was not available. Many also were unlikely to use a rest area when they were driving alone at night.

*Consuming caffeine*. Caffeine, even in low doses, significantly improves alertness in sleepy people (but only marginally in those already alert) (Regina et al., 1974; Lumley et al., 1987; Griffiths et al., 1990; Lorist et al., 1994). The minimum dose needed can be obtained in about two cups of percolated coffee, although caffeine content of coffee varies widely (Fox, 1993). Caffeine also is available in other forms such as caffeine-fortified soft drinks and tablets. In driving simulators, sleep-deprived drivers who consumed caffeine reduced lane deviations, potential crashes, and sleepiness for about an hour after consumption (Horne, Reyner, 1995a).

In addition, limited evidence suggests that physical discomfort (such as sitting in an uncomfortable seat or position and shivering or sweating) may also keep sleepy drivers awake (Åkerstedt, Ficca, 1997). Nicotine can improve short-term performance significantly in people with cognitive or attention performance impairments such as those from sleepiness (Kerr et al., 1991). Obviously, however, smoking tobacco should not be generally recommended in an educational campaign as a drowsy-driving countermeasure because the well-established risks substantially outweigh the possible benefits. The panel found no evidence of effectiveness for commonly accepted remedial approaches such as brief exercise (e.g., getting out of the car and walking around for a few minutes) (Horne, 1988), listening to the car radio, or opening the car windows (Horne, Reyner, 1995a). The panel found no studies evaluating other driver-reported steps such as talking to another passenger, talking on a cellular phone or CB radio, chewing gum or ice, or snacking. One study suggests that talking on a cellular phone while driving is associated with increased crash risk (Redelmeier, Tibshirani, 1997).

MEDICAL INTERVENTIONS TO TREAT NARCOLEPSY AND SLEEP APNEA SYNDROME

Although effective treatments are available for both narcolepsy and obstructive sleep apnea, relief of sleepiness and related symptoms is not always easily achievable for all patients (Broughton et al., 1981; Haraldsson et al., 1995). Although treatment can improve driving simulator performance (Findley et al., 1989), individual performance varies. A few studies to date have evaluated crash experiences of patients successfully treated for these disorders and found a positive effect (Cassel et al., 1996; Haraldsson et al., 1995). An impediment to diagnosis is a lack of physician education on the recognition of sleepiness and sleep disorders (National Commission on Sleep Disorders Research, 1993).

ALERTING DEVICES

To date, research has validated only one type of device that alarms or awakens drivers who are drowsy or asleep-shoulder rumble strips placed on high-speed, controlled-access, rural roads. A recent synthesis of reports on the effectiveness of rumble strips shows that they reduce drive-off-the-road crashes by 30 to 50 percent-the only countermeasure the panel found in any category that has a demonstrated effect on crashes. Rumble strips also appear to be a relatively low-cost solution with a positive benefit-to-cost ratio (Garder, Alexander, 1995; National Sleep Foundation, June 1997). However, the effectiveness of rumble strips has been demonstrated only in drive-off-the-highway crashes; their value with other types of sleepiness or inattention crashes or other types of roads has not been studied.

Section II lists some of the technological in-vehicle monitors designed to detect and evaluate driver sleepiness. Some of these devices contain alarms or other alerting devices that go off when indications of sleepiness occur. Controlled trials are needed to evaluate the usefulness of these tools.

An inherent deficiency in all types of alerting devices is that many people continue to drive even when they know they are drowsy and fighting to stay awake. Although an effective alerting device may prevent one crash, a driver who falls asleep once is likely to fall asleep again unless he or she stops driving. Some safety experts have expressed concern that alerting devices may in fact give drivers a false sense of security, encourage them to drive long after impairment, and inhibit their taking effective behavioral measures to prevent or relieve sleepiness (Lisper et al., 1986; Dinges, 1995; Horne, Reyner, 1995a).

SHIFT WORK MEASURES

Research has shown that effective steps are available for both employers and employees to reduce the likelihood of excessive sleepiness and drowsy driving. Because of the complexity of the issues involved (Rosekind et al., 1995), a combination of alertness management approaches is likely to be most effective. Researchers also have found differences in individual tolerance to shift work (Harma, 1993); knowing more about the biological and behavioral factors that determine these differences could provide direction for future educational efforts.

EMPLOYER MANAGEMENT OF WORK SCHEDULES

Several approaches have been effective in reducing sleepiness caused by working irregular hours and nighttime hours. To minimize disruption and help employees adjust to circadian rhythm changes, employers should educate employees about the problem (Harma, 1993). In addition, periods of work longer than 8 hours have been shown to impair task performance and increase crashes. For example, performance appears worse with a 12-hour, 4-day week schedule than with an 8-hour, 6-day week (Brown, 1994). In jobs with extended hours, the scheduling of work and rest periods to conform to circadian rhythms promotes better sleep and performance (Stampi, 1994). Another effective approach is to allow and facilitate napping for night shift workers (Dinges, 1992; Naitoh, 1992).

EMPLOYEE BEHAVIORAL STEPS

Shift workers themselves can take steps to reduce their risks of drowsy driving by planning time and creating an environment for uninterrupted, restorative sleep (good sleep hygiene) (Minors, Waterhouse, 1981; Rosa, 1990). Shift workers who completed a 4-month physical training program reported sleeping longer and feeling less fatigue than did matched controls who did not participate in the program. However, individual response to the stresses of shift work varies (Harma, 1993), and the background factors or coping strategies that enable some workers to adapt successfully to this situation are not well defined. The behavioral steps discussed earlier for younger males also seem reasonable for reducing risk in this population.

Nurses working the night shift reported using white noise, telephone answering machines, and light-darkening shades to improve the quality and quantity of daytime sleep (Novak, Auvil-Novak, 1996).

USING BRIGHT LIGHT TREATMENTS

060025

09951509 . 112101

Several studies show that timed exposure to bright light has been successful in helping shift workers and those suffering from jet lag adapt to and overcome circadian phase disruption (Czeisler et al., 1990; Stampi, 1994). This approach promotes longer, uninterrupted sleep, which may help reduce sleepiness on the job and behind the wheel. The panel did not find data linking such treatment to changes in rates of crashes or industrial accidents.

VII. FOCUSING AN EDUCATIONAL CAMPAIGN: PANEL RECOMMENDATIONS

To assist the NCSDR/NHTSA in developing its educational initiatives, the panel recommended three priorities for the campaign 1. Educate young males (ages 16 to 24) about drowsy driving and how to reduce lifestyle-related risks.
2. Promote shoulder rumble strips as an effective countermeasure for drowsy driving; in this context, raise public awareness about drowsy-driving risks and how to reduce them.
3. Educate shift workers about the risks of drowsy-driving and how to reduce them.

EDUCATE YOUNG MALES ABOUT DROWSY DRIVING AND HOW TO REDUCE LIFESTYLE-RELATED RISKS

Young males, ages 16 to 24, received highest priority because of their clear over-representation in crash statistics and because many of their lifestyle risks are amenable to change. Although males up to age 45 have increased crash risks, the panel targeted only the younger group to enable specific tailoring of educational messages to this population's needs and preferences. In fact, campaign designers may want to segment further, creating different messages for the 16-to-18 and 19-to-24 age groups. The younger group is high school age and more likely to live at home with parents; members of the older group are more likely to be working or in college, living on their own and less subject to parental authority. The panel also believes it may be worthwhile to educate preteen boys, their parents, and their schools to influence attitudes before problems begin. The messages might be the following: sleepiness is not inevitable for teens, and it is not okay to drive when you are sleepy.

The panel recognized that the risk-taking behaviors of younger men will be a challenge in developing successful educational approaches. Focus group research is needed to develop a better understanding of young men's perceptions of fall-asleep crash risk and the kinds of interventions that would be effective with this group. Based on the literature, however, the panel suggests that campaign designers consider the following message points, many of which are appropriate for all public audiences:

*Sleepiness is a serious risk for young male drivers.* Although little is known about the knowledge and attitudes of this group regarding sleepiness and driving risk, surveys of the general population suggest that knowledge of the risk is likely to be low and awareness will need to be raised. It also will be important for messages to affect attitudes, so that young men and their parents believe the risk is serious and young men are vulnerable. Misconceptions that sleepiness is inevitable at this age and that chronic sleepiness is a safe lifestyle choice need to be overcome. Understanding the concept of sleep debt could be useful, as could recognizing the uncontrollable nature of falling asleep at high levels of drowsiness.

*Driving between midnight and 6 a.m. is a high-risk situation.* Scheduling a trip at another time is a simple way to reduce risk, especially if the drive is long.

*An active lifestyle that restricts sleep is a special risk.* Many young men will recognize themselves in the picture of a chronically sleepy student who also works part-time, participates in extracurricular activities, and has an active social life. The "all nighter" represents an acute risk because extreme tiredness follows one sleepless night. The recommended action is not to start a long drive after one or more sleepless nights (e.g., do not drive home from college the day your exams are over; get a good night's sleep first).

*Drinking alcohol increases sleepiness, and the combination of alcohol and sleepiness decreases performance and increases risk, even at low levels of alcohol use.* A message that would convince young men not to drink when they are already sleepy could be useful. However, focus groups of youth in New York State revealed that drowsy-driving messages could be lost or ignored if paired with "don't drink and drive" messages, which some believe are already overemphasized (New York GTSC Sleep Task Force, 1994).

*You can take effective steps if you become sleepy while driving.* These steps include stopping driving altogether, if possible; consuming the caffeine equivalent of two cups of coffee; taking a 20-minute nap, and after the nap, driving to the closest safe resting spot, such as a motel, friend's house, or home; and sleeping.

Successful strategies from drinking and driving campaigns might also be adapted to drowsy driving if focus groups confirm their appeal. For example, an educational campaign could suggest that teens call a friend or a parent for a ride or let a friend drive home instead of driving while sleepy. Complementary educational messages to parents might suggest that they tell teenagers to call for a ride at any hour without recriminations if they feel too sleepy to drive. In another alcohol strategy variation, parents might allow sleepy friends of teens to sleep over rather than drive home.

The campaign also could counter common misconceptions of useful "stay awake" behaviors, such as exercising, turning on the radio, or opening the windows, which have not been shown to prevent sleep attacks.

Messages to policymakers could promote the value of graduated driver licensing that does not permit younger drivers to drive during late night hours (e.g., after midnight). These leaders may need information on the drowsy-driving problem and the special risks of driving during this period for all drivers and especially for younger ones.

PROMOTE SHOULDER RUMBLE STRIPS AS AN EFFECTIVE COUNTERMEASURE FOR DROWSY DRIVING; IN THIS CONTEXT, RAISE PUBLIC AWARENESS ABOUT DROWSY-DRIVING RISKS AND HOW TO REDUCE THEM

The panel believes that focusing a campaign on shoulder rumble strips offers multiple educational opportunities to convey key drowsy-driving messages.

Messages to the general public can explain the following:

*What rumble strips are and why they are increasingly being used.* A message that rumble strips are designed to arouse sleepy drivers before they drive off the road could be an attention-getting way to highlight the prevalence of chronic sleepiness and point out the risks and possible consequences of drowsy driving. People who have driven over a rumble strip in the past could personalize the risk, and even seeing the strips on the highway in the future could repeatedly remind people of the message.

*What to do when awakened by driving over a rumble strip.* Rumble strips act as an alarm clock, alerting drivers to the fact that they are too impaired to drive safely. The key to safety is what the driver does after hearing the alarm. In the short term, risk-reducing actions include stopping immediately if possible (e.g., a more alert driver can take over); consuming the caffeine equivalent of two cups of coffee; and taking a 65 060027

20-minute nap. Then the driver should get off the road (e.g., at a motel or rest stop) as soon as possible and sleep.

In the longer term, planning ahead can help people avoid driving while drowsy. Key steps include planning sleep and naps before long trips, scheduling trips to avoid midnight through 6 a.m. driving, and avoiding alcohol and sedating medicines while sleepy or sleep deprived.

*The limitations of rumble strips.* Rumble strips should not give drivers a false sense of security about driving while sleepy. The strips are useful as alerting devices, but they will not protect drivers who continue to drive while drowsy. Being awakened by driving over a rumble strip is a warning to change sleep and driving behaviors for safety. The strips are not a technological quick fix for sleepy drivers.

Messages to policymakers, especially from States in which rumble strips are not currently used, can emphasize what rumble strips are, their relative cost-effectiveness, and why they are a valuable addition to highways in rural areas. Policymakers also may need information on the risks of drowsy driving and crashes to put the need for rumble strips in perspective.

EDUCATE SHIFT WORKERS ABOUT THE RISKS OF DROWSY DRIVING AND HOW TO REDUCE THEM

Employers, unions, and shift workers are potential target audiences for education on shift work and drowsy driving issues. The panel believes that an initial focus on employees would complement and reinforce other drowsy-driving messages directed to the public. Although many shift workers are not in a position to change or affect their fundamental work situation, they and their families may benefit from information on their risks for drowsy driving and effective countermeasures. Key message points include the following:

*Shift work may increase the risk of drowsy-driving crashes.* Night-, early morning-, and rotating-shift workers are often sleepy because their work times are inconsistent with the natural sleep-wake cycle. Workers on these shifts routinely get less sleep and lower quality sleep than do day workers. Driving while sleepy is a risky behavior that leads to many serious crashes each year.

*Driving between midnight and 6 a.m. and driving home immediately after an extended or night shift are special risks for a drowsy-driving crash.* Driving during late night/early morning hours increases risk for all drivers because those hours are a natural period of sleepiness. Many drowsy-driving crashes occur at this time. Driving while acutely tired, such as after a night shift, also increases the risk of crashing. Shift workers, many of whom are already chronically sleep deprived, are at extra risk.

*You can take effective steps to reduce your risks.* First, it is important to give regular priority to getting good sleep by creating a quiet, cool, dark environment, allowing sufficient time for sleep, and trying to sleep during the same hours each day. Another strategy is to avoid driving home from work while sleepy (e.g., getting a ride from a family member, taking a cab, napping before heading home). Consuming caffeine equivalent to two cups of coffee may help improve alertness for a short period.

OTHER ORGANIZATIONS CAN PROVIDE DROWSY DRIVING EDUCATION

The panel recognizes that limitations in resources will not allow NCSDR/NHTSA to conduct all needed educational interventions. However, other sponsors can make an important contribution by disseminating messages to high-risk audiences, intermediaries, and gatekeepers, such as industries where shift work is prevalent. Potential sponsors may include consumer, voluntary, health care professional, and industry groups and other government agencies. The panel encourages such groups to use this report and resulting campaign materials to inform and assist their own audience-specific efforts. NCSDR/NHTSA efforts to educate the public, especially youth, about the importance of sleep and sleep hygiene should complement other initiatives and, in combination, reinforce messages on the prevention of fall-asleep crashes.

OSHA

Home | Index | Search

Technical Links | What's New | Subjects | Comments

- Motor Vehicle Safety
  - Introduction
  - Recognition
  - Evaluation
  - Controls
  - Compliance
  - Other Motor Vehicle Safety

Introduction

According to the Bureau of labor Statistics, over 2,000 deaths a year result from occupational motor vehicle incidents, more than 30% of the total annual number of fatalities from occupational injuries. These deaths include driver and passenger deaths in highway crashes, farm equipment accidents, and industrial vehicle incidents as well as pedestrian fatalities.

There are no specific OSHA standards concerning workplace motor vehicle safety, however most of the occupational fatalities occur on public highways where there are seat belt requirements and traffic laws. OSHA issued a Notice of Proposed Rulemaking in July 1990 for a standard which would have required seat belt use and driver awareness programs. Considerable controversy sparked by the proposal resulted in a 1992 Congressional directive to reconsider several issues (for example - requirements for mandatory seat belt use and driver awareness training, and impact on small businesses) prior to issuing any final rule.

Related Technical Links:

- Agricultural Operations
- Powered Industrial Trucks
- Diesel Exhaust

Recognition

- NIOSH Alert: Preventing Worker Injuries and Deaths from Traffic-Related Motor Vehicle Crashes. DHHS (NIOSH) Publication No. 98-142 (1998, July), 18 pages. This document includes extensive accident statistics and information on regulations and control recommendations.
- NIOSH Update: NIOSH Report Highlights Motor Vehicle Crash Risk for Workers, Recommends Practical Control Measures. (1998, July 27), 2 pages. Provides a summary of the above NIOSH Alert (Publication No. 98-142).

- OSHA Summary Sheet (1994), 1 page.
- Leading Causes of Occupational Injury, Illness and Death - Appendix A. OSHA (1993). 2 pages. Statistical listings of vehicle injuries and fatalities.
- Commercial Vehicle Safety Alliance, (1998), 1 page. Main directory for the Canada, USA, and Mexico territories contains various press releases, presidential notes, and training information.
- Powered Industrial Trucks. Department of Energy. (1996, April 18), 1 page. This site contains information on industrial truck safety. Topics include standards and codes, protective devices, work practices, training, and hazards.

Evaluation

- Safety is our Driving Force - Truck and Bus Safety Summit. Department of Transportation. (1995), 1 page. This page contains several links. The Summit was designed to identify critical safety issues from a wide range of perspectives representing, among other groups, the manufacturers of large trucks, shippers and carriers, drivers, highway safety advocates and government agencies including law enforcement.
- Commercial Vehicle Inspector's Reference Section. Inspector on-line services. 1 page. This pages lists inspection information for various commercial vehicle industries.
- Commercial Vehicle Safety Inspectors. Inspector on-line services. 2 pages. This page contains links of interest regarding Commercial Vehicle Safety, such as national and federal organizations, state provinces, Mexico, Canada, and industry associations/organizations.

Controls

- Motor Carrier Operations. Department of Transportation. 2 pages. This technology group promotes the uses of advanced technologies to facilitate the safe and efficient movement of goods by the motor carrier industry both nationally and internationally.
- Motor Carrier Safety Law - Federal. NIOSH - National Ag Safety Database, Fact Sheet FRE-96. (1992, July), 3 pages. Provide detailed safety and licensing regulations for motor vehicles and drivers of motor vehicles. There are two parts of the regulations which are relevant to agriculture: 1) drivers of farm trucks; and, 2) vehicles and drivers which transport migrant farm workers.

Compliance

- OSHA Standards
  - 1917.44, Marine Terminals, General rules applicable to vehicles.
  - 1926.600, Construction, Motor Vehicles, Mechanized Equipment, and Marine Operations.
  - 1926.601, Construction, Motor vehicles.
  - 1926.602, Construction, Material handling equipment.
  - 1928.51, Agriculture, Roll-over protective structures (ROPS) for tractors used in agricultural operations.

- Review Commission Decisions
  - Docket: 91-2578 (1994, March 31), 8 pages. Whether trailers being used to move dirt on a construction site are "motor vehicles," and whether those trailers and the tractors pulling them fall in the category of vehicles.

- Standard Interpretations and Compliance Letters
  - Cross-view back-up mirrors on delivery trucks. (1997, January 24), 2 pages.
  - Passenger seat belts not required on school buses. (1994, January 19), 2 pages.
  - Review of Policy on Section 4 (b) (1) of the Department of Transportation's (DOT) Motor Carrier Safety Act. (1989, July 10), 5 pages.

- Other Standards
  - Title 49, Subtitle VI – Motor Vehicle and Driver Programs. Cornell University. 1 page. Below are specific sections of interest.
    - Chapter 301 Motor Vehicle Safety, 42 pages. Prescribed motor vehicle safety standards for motor vehicles and motor vehicle equipment in interstate commerce and ways to carry out needed safety research and development.
    - Chapter 311 Commercial Motor Vehicle Safety, 1 page.
    - Chapter 313 Commercial Motor Vehicle Operators, 1 page.
    - Chapter 315 Motor Carrier Safety, 1 page.
  - Motor Vehicle Safety and Insurance for Transportation of Migrant and Seasonal Agricultural Workers, Department of Transportation – Part 500, Subpart D. (1 page). This is a general listing. Below are topics related to vehicle safety:
    - 500.100 - Vehicle safety obligations
    - 500.101 - Promulgation and adoption of vehicle standards
    - 500.102 - Applicability of vehicle safety standards

060032

70

- 500.103 - Activities not subject to vehicle safety standards
- 500.104 - Department of Labor standards for passenger automobiles and station wagons and transportation of seventy-five miles or less
- 500.105 - DOT standards adopted by the Secretary

Other

- Stein, H.S. and Jones, I.S., *Crash Involvement of Large Trucks by Configuration: A Case Control Study*, American Journal of Public Health, 78:491-98 (1988).
- *Fatigue, Alcohol, Other Drugs and Medical Factors In Fatal to the Driver Heavy Crashes*, National Transportation Safety Board (Feb. 5, 1990).
- Jones, I.S. and Stein, H.S., *Effect of Driver Hours of Service on Tractor-Trailer Crash Involvement*, IIHS (1987).

---

Revision Date: 29 June 1999

What is claimed is:

1. A monitor for a vehicle allowing oversight and detection of vehicular activity, comprising:

a first camera, said first camera directed towards a roadway upon which the vehicle is traveling, said first camera directed towards a first line painted on said roadway;

a roadway detector, said roadway detector coupled to said first camera and receiving signals from said first camera, said roadway detector detecting signals from said first camera indicating presence of said first line; and a recorder, said recorder coupled to said first camera and recording signals transmitted by said camera; whereby activity of the vehicle on said roadway is detected and recorded for present and future review and analysis.

2. The monitor of claim 1, further comprising:

said recorder being capable of preserving said camera signals despite a collision, accident, or similar catastrophe.

3. The monitor of claim 1, further comprising:

an indicator, said indicator coupled to said roadway detector, said indicator indicating disposition of said vehicle upon said roadway relative to said first line.

4. The monitor of claim 3 wherein said indicator indicates deviation of the vehicle from a fixed distance relative to said first line.

5. The monitor of claim 4 wherein said fixed distance is set by the driver.

6. The monitor of claim 3 wherein said indicator indicates change in position from a previous position relative to said first line.

7. The monitor of claim 6 wherein said indicator indicates that the driver is weaving when constant change in position is detected.

8. The monitor of claim 4, further comprising:

said indicator issuing a warning when the vehicle departs from a path defined by said first line.

9. The monitor of claim 8 wherein said warning is selected from a group comprising light, sound, vibration, mist, wind, heat, cold air, scent, or a combination thereof.

10. The monitor of claim 8 wherein the driver of the vehicle may set a threshold value for the amount that the vehicle departs from said path for said indicator to issue said warning.

11. The monitor of claim 8 wherein said warning is issued when either the vehicle departs from a position having a fixed distance from said first line, when the vehicle constantly changes its position from a previous position relative to said line, when a long term pattern of steering errors is detected, when long term non-movement of the vehicle's steering wheel is detected, when the vehicle's traveling on the rumble bars of said roadway is detected, or a combination thereof.

12. The monitor of claim 1, further comprising:

a second camera, said second camera directed towards said roadway and directed towards a second line painted on said roadway; said first line being on one side of the vehicle and said second line being on an opposite side of said vehicle, said vehicle travelling between said first and second lines;

said second camera coupled to said roadway detector, said roadway detector receiving signals from said second camera and detecting signals from said second camera indicating presence of said second line; whereby coordinated detection of said first and second lines by said roadway detector indicates disposition of the vehicle between said first and second lines and proper travel of the vehicle along said roadway between said first and second lines.

13. The monitor of claim 12, further comprising:

an indicator, said indicator coupled to said roadway detector, said indicator indicating disposition of said vehicle upon said roadway relative to said first and second lines.

14. The monitor of claim 13 wherein said indicator indicates deviations of the vehicle from a center position between said first and second lines.

15. The monitor of claim 13, further comprising:

said indicator issuing a warning when the vehicle departs from a path defined by said first and second lines.

16. The monitor of claim 1, further comprising:

a light source, said light source illuminating said roadway before said first camera; whereby said roadway, including said first line, are better detected by said first camera.

17. The monitor of claim 16, further comprising:

said light source transmitting light of a certain character;

said first camera detecting light of said certain character; whereby said light source may selectively illuminate said roadway for said first camera by light of said certain character and allowing said first camera to specifically detect said light of certain character and ignore light not having said certain character.

18. The monitor of claim 17 wherein said certain character of light is infrared.

19. The monitor of claim 1, further comprising:

said roadway detector determining centroids of signals received from said first camera, said centroids indicating presence and relative location of said first line.

20. The monitor of claim 1, further comprising:

said roadway detector coupled to a turn indicator, said roadway detector compensating for departure of said vehicle from a path associated with said first line.

21. The monitor of claim 1, further comprising:

a vehicle distance detector, said vehicle distance detector coupled to said roadway detector, said vehicle distance detector detecting a distance between the vehicle and a second vehicle in front of the vehicle, said vehicle distance detector indicating said distance.

22. The monitor of claim 21, further comprising:

a cruise control, said cruise control coupled to a throttle of said vehicle and said vehicle distance detector, said cruise control keeping or holding the vehicle at a certain minimum distance from said second vehicle.

23. The monitor of claim 1, further comprising:

a wireless communication system, said wireless communication system coupled to said roadway detector, said wireless communication system providing wireless communications between the monitor and a wireless communications network.

24. The monitor of claim 23, further comprising:

a global positioning system (OPS) receiver, said GPS receiver coupled to said wireless communication system; whereby vehicle location information may be transmitted to said wireless communications network.

25. The monitor of claim 23, further comprising:

a logbook recorder, said logbook recorder coupled to said wireless communication network, said logbook recorder recording data pertinent to operation and maintenance of said vehicle, whereby remote monitoring of the vehicle and its operational status may occur when data recorded in said logbook is transmitted to said wireless communications network and received by another.

26. The monitor of claim 1 wherein said first camera is mounted within a side mirror housing.

27. The monitor of claim 1 wherein the driver may zero the system to indicate a set position where the driver desires to be relative to said first line, and wherein said detector detects deviations from said set position.

28. The monitor of claim 1 wherein said detector detects change from a previous position relative to said first line.

29. The monitor of claim 1 wherein said detector detects non-movement of the steering wheel of said vehicle.

30. The monitor of claim 1 whereby when the driver activates the turn signal of said vehicle, said detector detects and associates said vehicle's speed and position with the driver's changing of a traffic lane.

31. A monitor for a vehicle allowing oversight, detection, and recording of vehicular activity, comprising:

a first camera, said first camera directed towards a roadway upon which the vehicle is traveling, said first camera directed towards a first line painted on said roadway;

a second camera, said second camera directed towards said roadway and directed towards a second line painted on said roadway; said first line being on one side of the vehicle and said second line being on an opposite side of said vehicle, said vehicle traveling between said first and second lines;

first and second light sources, said first and second light sources respectively illuminating said roadway before said first and second cameras so that said roadway, including said first and second lines, are better detected by, respectively, said first and second cameras;

a roadway detector, said roadway detector coupled to said first and second cameras and receiving signals from said first and second cameras, said roadway detector detecting signals from said first camera indicating presence of said first line, said roadway detector detecting signals from said second camera indicating presence of said second line, so that coordinated detection of said first and second lines by said roadway detector indicates disposition of the vehicle between said first and second lines and proper travel of the vehicle along said roadway between said first and second lines;

said roadway detector determining centroids of signals received from said first and second cameras, said centroids respectively indicating presence and relative location of said first and second lines;

said roadway detector coupled to a turn indicator, said roadway detector compensating for departure of said vehicle from a path associated with said first and second lines when said turn indicator is activated;

an indicator, said indicator coupled to said roadway detector, said indicator indicating disposition of said vehicle upon said roadway relative to said first and second lines, said indicator issuing a warning when the vehicle departs from a path defined by said first and second lines; and a recorder, said recorder coupled to said first and second cameras and recording signals transmitted by said cameras, said recorder preserving said camera signals despite a collision, accident, or similar catastrophe; whereby activity of the vehicle on said roadway is detected to aid a driver of the vehicle and recorded for future review and analysis.

32. The monitor of claim 31, further comprising:

said first and second light sources transmitting light of a certain character;

said first and second cameras detecting light of said certain character; whereby said light source may selectively illuminate said roadway for said first and second cameras by light of said certain character and allowing said first and second cameras to specifically concentrate on said light of certain character and ignore light not having said certain character.

33. The monitor of claim 31, further comprising:

a vehicle distance detector, said vehicle distance detector coupled to said roadway detector, said vehicle distance detector detecting a distance between the vehicle and a second vehicle in front of the vehicle, said vehicle distance detector indicating said distance.

34. The monitor of claim 33, further comprising:

a cruise control, said cruise control coupled to a throttle of said vehicle and said vehicle distance detector, said cruise control keeping or holding the vehicle at a certain minimum distance from said second vehicle.

35. The monitor of claim 31, further comprising:

a wireless communication system, said wireless communication system coupled to said roadway detector, said wireless communication system providing wireless communications between the monitor and a wireless communications network.

36. The monitor of claim 35, further comprising:

a global positioning system (GPS) receiver, said GPS receiver coupled to said wireless communication system; whereby vehicle location information may be transmitted to said wireless communications network.

37. The monitor of claim 36, further comprising:

a logbook recorder, said logbook recorder coupled to said wireless communication network, said logbook recorder recording data pertinent to operation and maintenance of said vehicle, whereby remote monitoring of the vehicle and its operational status may occur when data recorded in said logbook is transmitted to said wireless communications network and received by another.

38. A method for rating and/or monitoring a driver's performance comprising:

providing a monitor for a vehicle allowing oversight, detection, and recording of vehicular activity, said monitor comprising:

a first camera, said first camera directed towards a roadway upon which the vehicle is traveling, said first camera directed towards a first line painted on said roadway;

a roadway detector, said roadway detector coupled to said first camera and receiving signals from said first camera, said roadway detector detecting signals from said first camera indicating presence of said first line, and a recorder, said recorder coupled to said first camera and recording signals transmitted by said camera, said recorder preserving said camera signals; and detecting and recording activity of the vehicle on said roadway for present and future review and analysis.

39. The method of claim 38 wherein said detector detects driver deviations from a path relative to said first line.

40. The method of claim 39 further comprising rating driver performance based on a record of accumulated deviations recorded over a time period.

41. The method of claim 40 wherein said driver performance is rated by determining the root mean square value of said accumulated deviations.

42. The method of claim 40 wherein said path is defined by a line having a set distance away from said first line.

43. The method of claim 40 further comprising:

said monitor further having a second camera, said second camera directed towards said roadway and directed towards a second line painted on said roadway;

said first line being on one side of the vehicle and said second line being on an opposite side of said vehicle, said vehicle traveling between said first and second lines;

said second camera coupled to said roadway detector, said roadway detector receiving signals from said second camera and detecting signals from said second camera indicating presence of said second line; whereby coordinated detection of said first and second lines by said roadway detector indicates disposition of the vehicle between said first and second lines and proper travel of the vehicle along said roadway between said first and second lines; and said path being a center path between said first and second lines.

44. The method of claim 38 further comprising providing a station having a simulated road lane for calibrating the monitor, and testing the driver.

* * * * *